Aug. 19, 1941.     G. J. CALAME     2,252,879
PRODUCTION BLADE GRINDER
Filed Feb. 15, 1939     8 Sheets-Sheet 1

INVENTOR
GORDON J. CALAME
BY
Evans & McCoy
ATTORNEYS

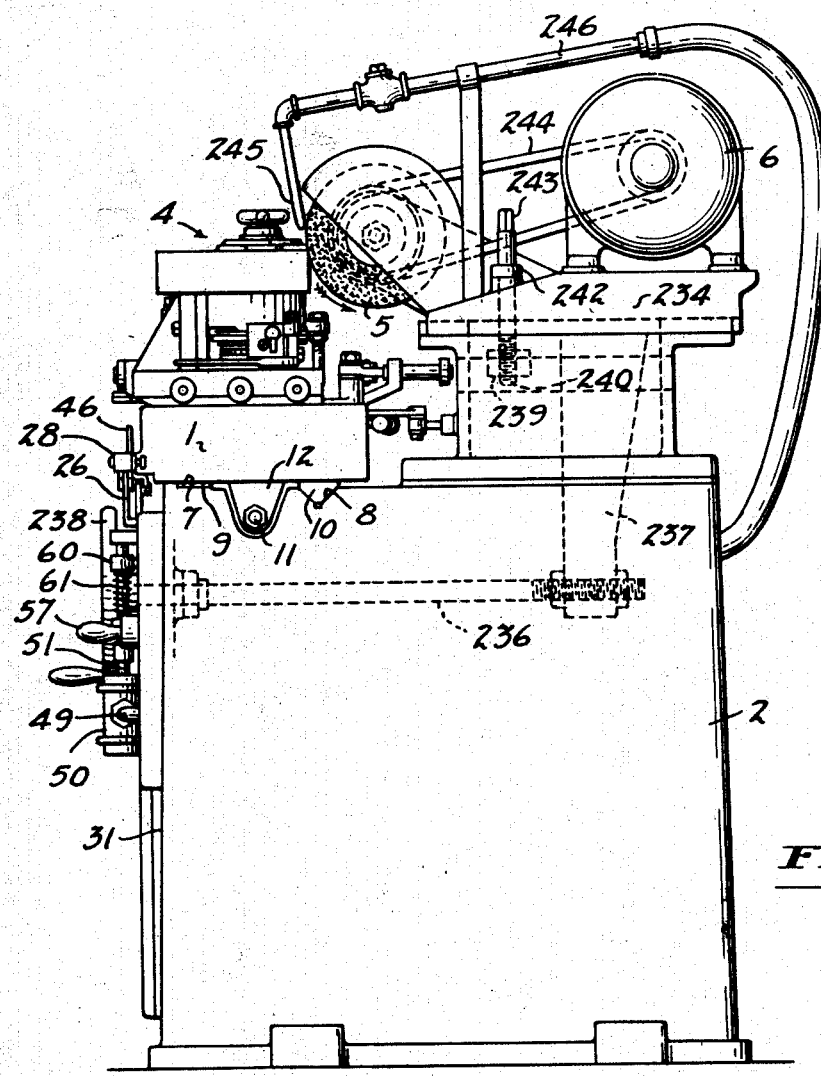
Fig. 2
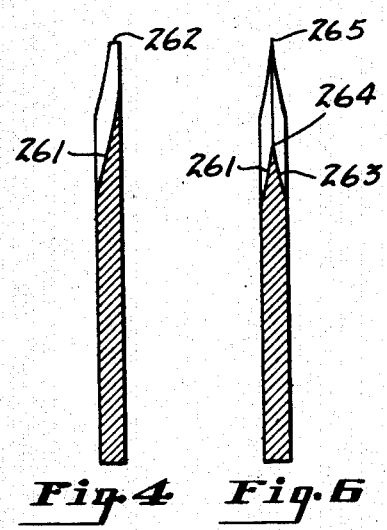
Fig. 4  Fig. 6
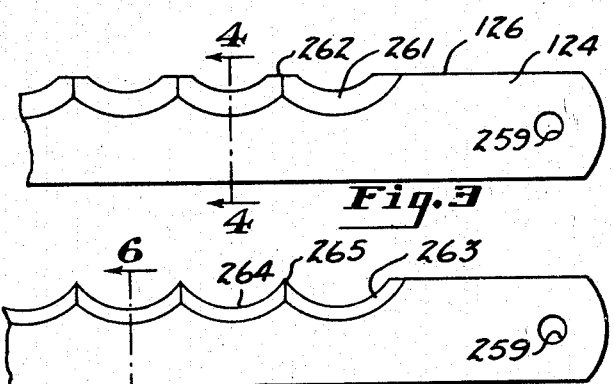
Fig. 3
Fig. 5

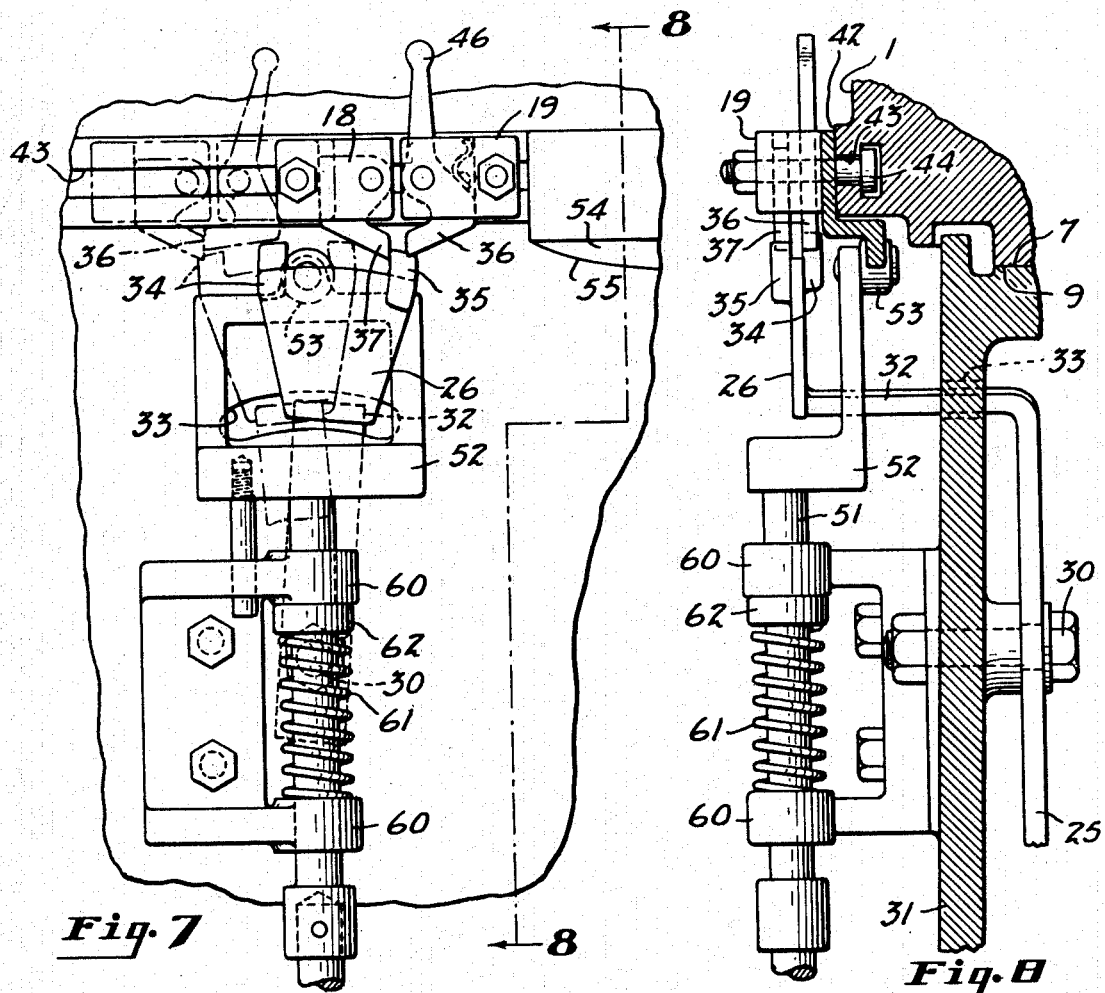
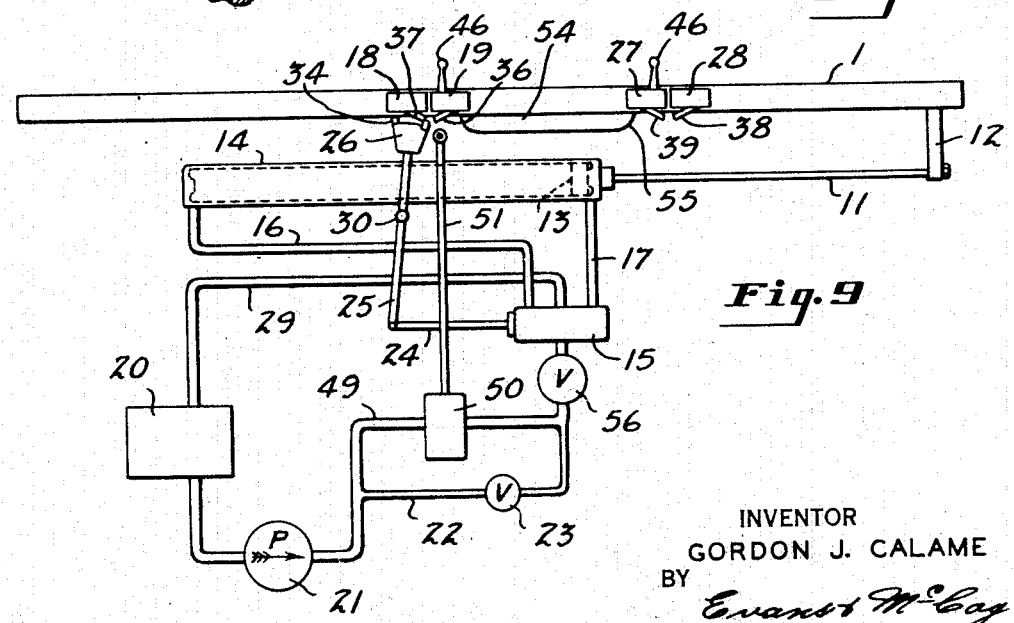

Aug. 19, 1941.  G. J. CALAME  2,252,879
PRODUCTION BLADE GRINDER
Filed Feb. 15, 1939  8 Sheets-Sheet 4
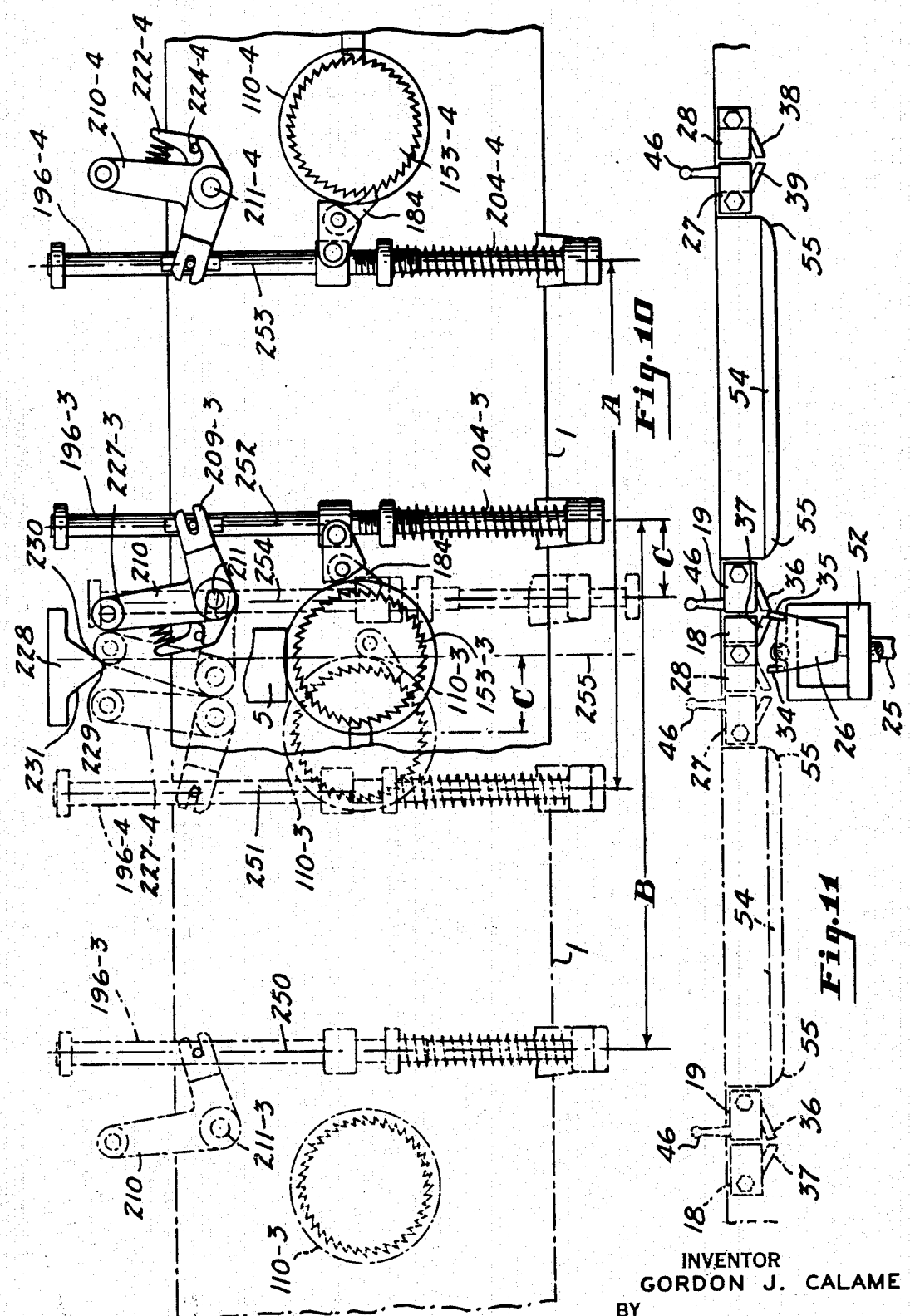
INVENTOR
GORDON J. CALAME
BY
Evans & McCoy
ATTORNEYS

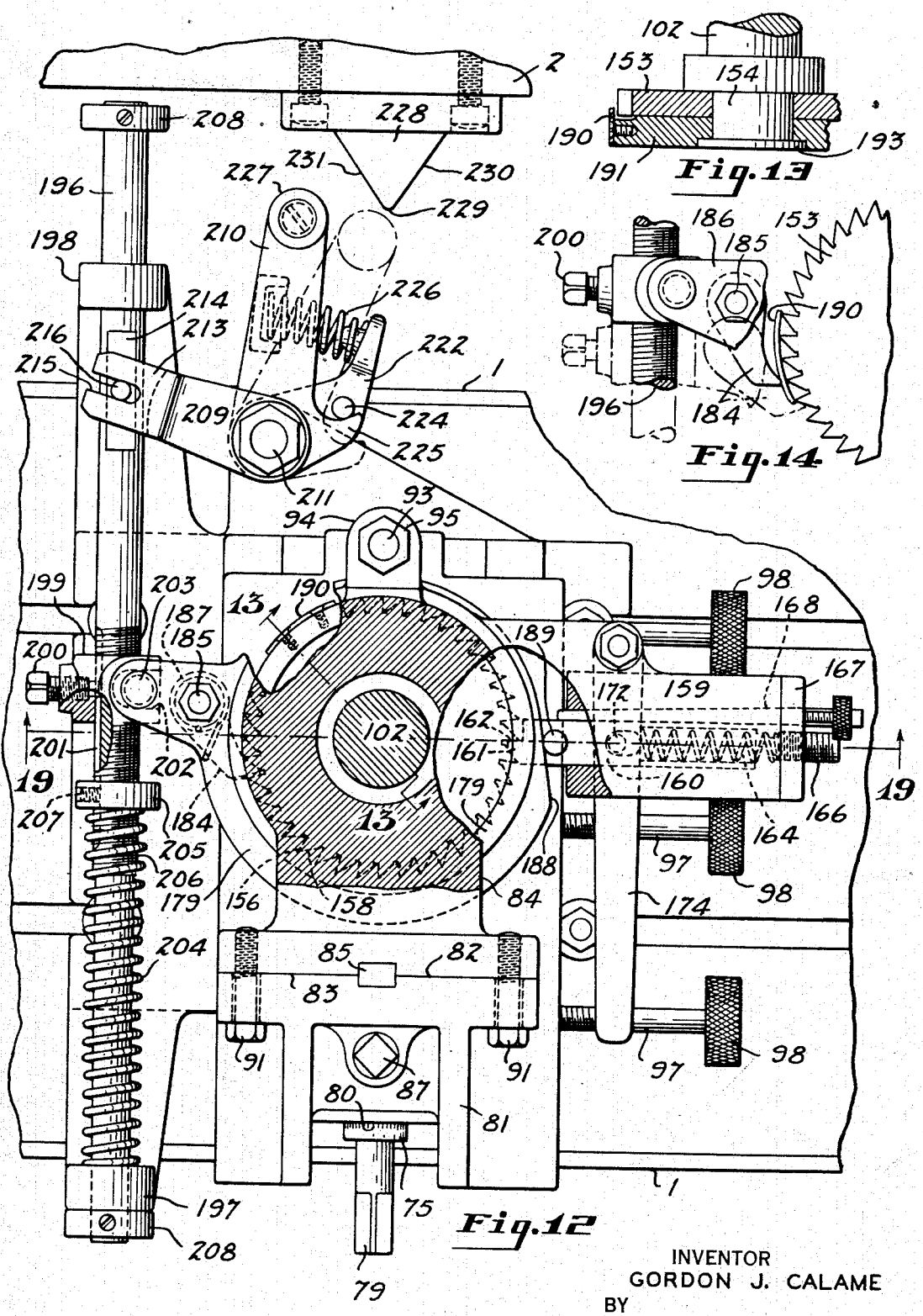

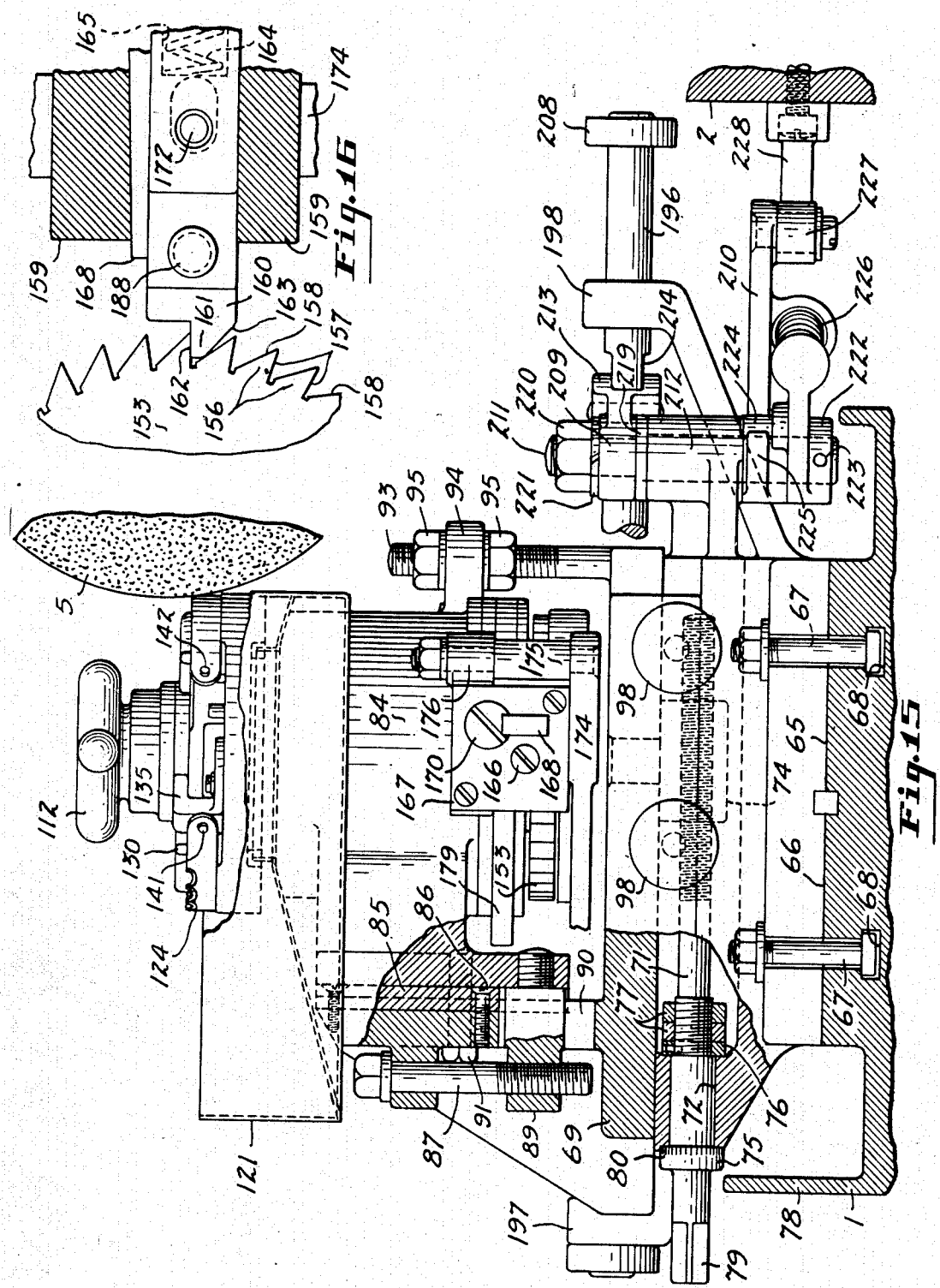

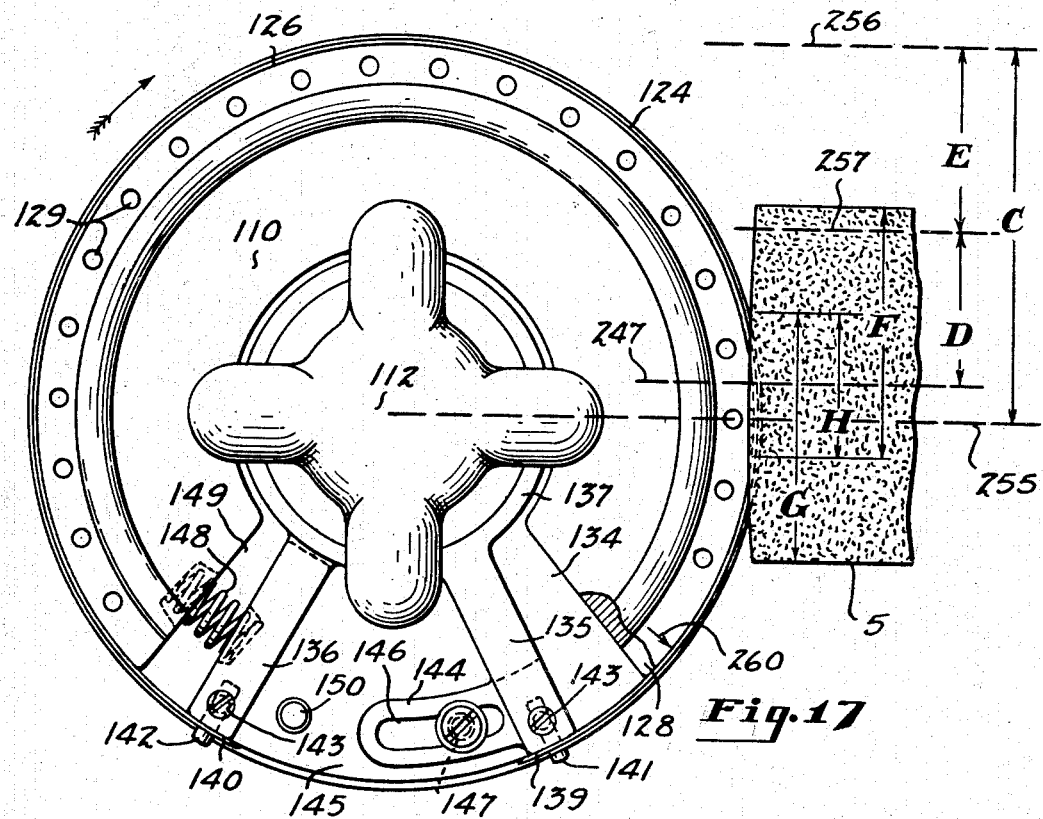
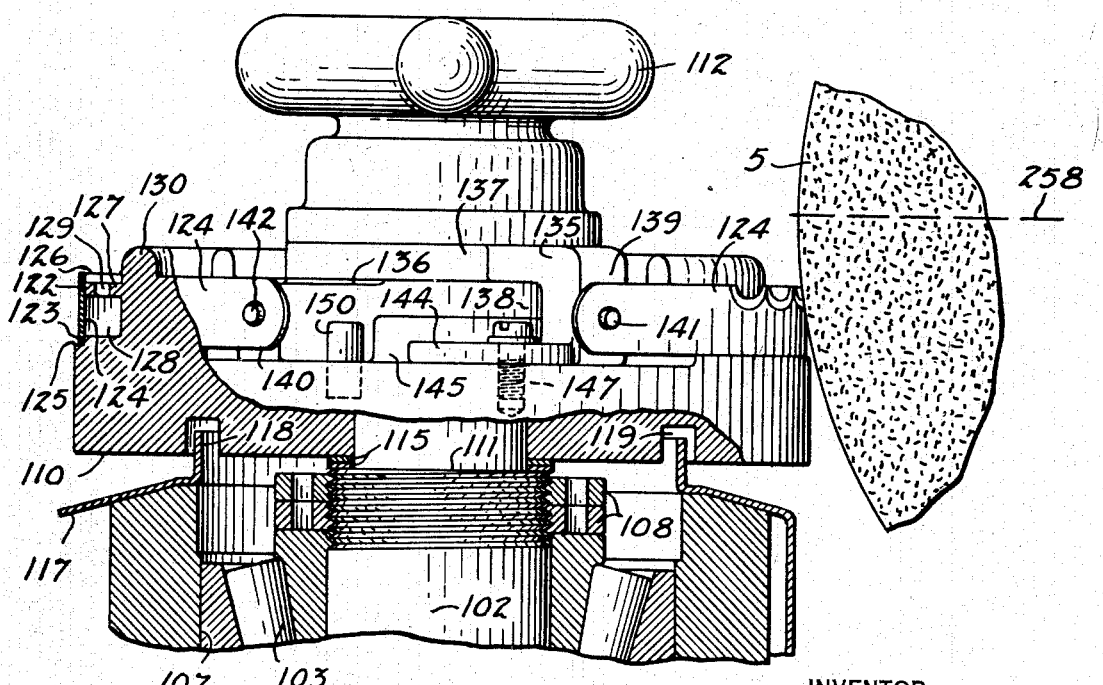

INVENTOR
GORDON J. CALAME
BY
Evans & McCoy
ATTORNEYS

Patented Aug. 19, 1941

2,252,879

UNITED STATES PATENT OFFICE 2,252,879

PRODUCTION BLADE GRINDER

Gordon J. Calame, Bettendorf, Iowa

Application February 15, 1939, Serial No. 256,523

37 Claims. (Cl. 51—92)

This invention relates to grinding machines and their operation and more particularly to a machine for grinding relatively thin, flexible cutting blades of the character used in bread slicing machines.

In producing thin, flexible blades of the type used in bread slicing machines and which have serrated cutting edges consisting of a series of indentations or scallops, it is of considerable importance that the blades be held securely during the grinding of each scallop or indentation and that successive indentations be accurately spaced apart. It is, therefore, an object of the invention to provide an apparatus for grinding scalloped blades which rigidly supports and accurately positions each blade being ground and is provided with means for taking up or compensating for slack or wear which occurs in moving parts.

The invention contemplates improvements in the means for advancing each blade longitudinally and in intermittent fashion so that successive portions of the cutting edge are presented to the grinding wheel and improved means for preventing further advancement of the blade being ground after the grinding of the last scallop or indentation therein.

Another object of the invention is to provide an improved apparatus for grinding or producing cutter blades having cutting edges in the form of serrations or scallops, a related but more specific object of the invention being to produce such blades with greater accuracy and uniformity and more quickly than has previously been done.

Another object is to provide an apparatus for producing serrated or scalloped cutter blades by means of which a single grinding wheel grinds the scallops on blades held by a plurality of fixtures which are successively moved to a grinding station in proximity to the wheel so that the periods of idle running of the grinding wheel are reduced to a minimum.

Another object is to provide an improved blade holding drum and fixture for supporting a blade being ground and having a novel arrangement for cooling a blade during a grinding operation, the drum being formed for circulation of cooling liquid over the major portions of both sides of the blade so that burning of the blade during the grinding thereof at a high rate of speed is avoided.

Another object is to provide an improved apparatus for operating a grinding wheel which imparts self dressing characteristics to the grinding wheel and enables substantially continuous operation over relatively long periods of time without refacing or dressing the abrading surface of the wheel.

A still further object of the invention is to provide an apparatus for the production of thin, flexible blades which is simple in design and construction and inexpensive to manufacture and operate. Other objects and advantages will become apparent from the following detailed description of a suitable embodiment of the invention which is made in connection with the accompanying drawings, in which:

Fig. 2 is an end elevational view of the blade grinding apparatus shown in Fig. 1;

Fig. 3 is a fragmentary view showing a blade which has been ground on one side by the apparatus of the present invention;

Fig. 4 is a sectional detail taken substantially on the line 4—4 of Fig. 3 and enlarged with respect thereto;

Fig. 5 is a fragmentary view of a blade which has been ground on both sides by the apparatus of the present invention;

Fig. 6 is a sectional detail taken substantially on the line 6—6 of Fig. 5 and enlarged with respect thereto;

Fig. 7 is an elevational detail showing the valve tripping mechanism for controlling the reciprocation of the work table or carriage of the apparatus;

Fig. 8 is a sectional detail, with parts removed, taken substantially on the line 8—8 of Fig. 7;

Fig. 9 is a diagrammatic layout drawing showing the hydraulic mechanism and connections for actuating the carriage;

Fig. 10 is a diagrammatic plan view of the carriage, with parts removed, showing the ratcheting mechanisms for rotating the blade holding fixtures in various positions;

Fig. 11 is a diagrammatic elevational view showing the carriage and valve tripping mechanism at various positions;

Fig. 12 is a detail plan view, partly in section and with parts removed, taken substantially on the line 12—12 of Fig. 19, showing one of the blade holding fixtures and the ratcheting mechanisms associated therewith;

Fig. 13 is a sectional detail with parts broken away taken substantially on the line 13—13 of Fig. 12;

Fig. 14 is a fragmentary plan view showing the movement of the ratcheting pawl;

Fig. 15 is an elevational view, partly in section and with parts removed, showing one of the blade holding fixtures and taken substantially on the line 15—15 of Fig. 1, being enlarged with respect thereto;

Fig. 16 is a fragmentary detail showing the engagement of the index wheel by the indexing pawl;

Fig. 17 is a plan view, partly in section and with parts removed, showing the blade receiving drum of one of the blade holding fixtures;

Fig. 18 is an elevational view, partly in section and with parts removed, of the apparatus shown in Fig. 17;

Figure 1:
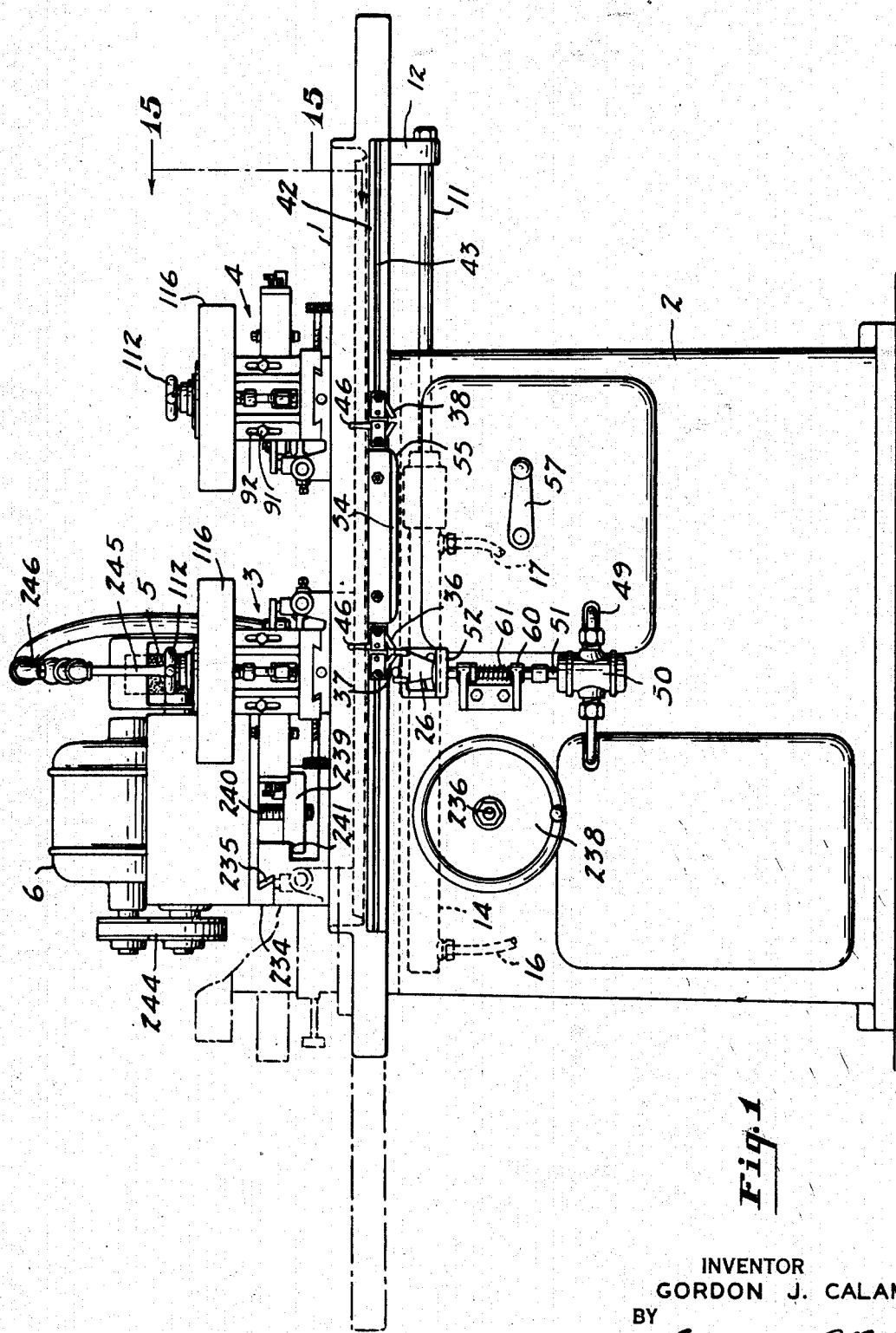
Figure 1 is a front elevational view of the blade grinding apparatus.

The grinding machine illustrated in the accompanying drawings includes a carriage 1, reciprocally mounted on a supporting structure 2. Adjustably mounted on the carriage are left and right blade holding fixtures indicated generally by the numerals 3 and 4 respectively, which are arranged to be individually reciprocated across a portion of the abrading surface of a grinding wheel 5, which is also adjustably mounted on the supporting structure 2, and driven by an electrical motor 6. Flat and V-shaped runners 9 and 10, respectively, of the carriage, ride on a flat track 7 and V-shaped track 8 formed across the front of the supporting structure.

The carriage is moved back and forth over the tracks 7 and 8 by a rod 11, secured to a depending bracket 12 formed on the right hand end of the carriage 1, as viewed in Figs. 1 and 9. The end of the rod 11 opposite the bracket 12 carries a double acting piston 13 which slides within a cylinder 14. The ends of the cylinder 14 are closed and are connected to a carriage reciprocating control valve 15 by means of conduits 16 and 17, which communicate with the left and right hand ends respectively of the cylinder, as viewed in Figs. 1 and 9. High pressure fluid is supplied to the valve 15 from a reservoir 20 by means of a pump 21 through conduit 22. A throttling valve 23 is interposed in the conduit 22 so as to regulate the pressure at which fluid is supplied to the valve 15. The carriage control valve 15 is actuated through a rod 24 by means of a pivoted lever 25; the latter carrying on its upper end an element 26 which is engaged by depending fingers of valve actuating dogs, to be later described, mounted on the carriage 1.

The actuating mechanism for the carriage is arranged so that while the blade holding fixture 3 is disposed at the grinding station adjacent the grinding wheel 5, the carriage 1 is reciprocated over a relatively short path C, Figs. 10 and 17, under the control of valve shifting dogs 18 and 19. Similarly, when the blade holding fixture 4 is adjacent the grinding wheel, the carriage is reciprocated over a relatively short path under the control of valve shifting dogs 27 and 28. When the carriage 1 is being moved to the left, as viewed in Figs. 1 and 9, the pivoted arm 25 is substantially in the position shown in Fig. 9 and the rod 24 is withdrawn from the valve 15 so as to admit high pressure fluid to the right hand end of the cylinder 14 through the conduit 17. During movement of the carriage to the right as viewed in the same figures, the pivot arm 25 is tilted in a counter-clockwise direction from that shown in Fig. 9, so that the rod 24 moves into the valve 15 and high pressure fluid is admitted to the left hand end of the cylinder 14 through the conduit 16, as viewed in Fig. 9. The valve 15 is arranged so that when high pressure fluid is being introduced into the cylinder 14 through the conduit 16, fluid from the right hand end of the cylinder flows through the conduit 17 to the valve 15 and is discharged through a return conduit 29 which conducts the fluid to the reservoir 20. Similarly, when high pressure fluid is introduced into the right hand end of the cylinder through the conduit 17, fluid from the left hand end of the cylinder 14 flows through conduit 16 to the valve 15 and is discharged into the reservoir through the conduit 29.

As shown in Fig. 8, the arm 25 is pivoted at 30 on the inside of front panel 31 of the supporting structure 2. An angular portion 32 at the top of the arm 25 extends through an elongated slot 33 formed in the panel 31 and carries on the outside of the supporting structure the element 26. This element has offset stops 34 and 35 which are engaged by fingers of the valve actuating dogs. The dogs 18 and 27 have depending therefrom fingers 37 and 39 respectively which are in alignment with one another and with the stop 35 of the valve shifting element to move the latter to the right as viewed in Figs. 1, 7 and 9. The dogs 19 and 28 have depending therefrom fingers 36 and 38 respectively which are in alignment with one another and with the stop 34 to engage the latter and shift the element 26 to the left as viewed in Figs. 1, 7 and 9.

The operation of the reciprocating carriage under the control of dogs 18 and 19 is readily understood from Fig. 7. Assuming the carriage is moving to the right as viewed in Figs. 1, 7 and 9, finger 37 of the dog 18 engages the stop 35 of the valve shifting element after a predetermined travel of the carriage 1, and shifts the element 26 to substantially the full line position indicated in Fig. 7. This movement of the element 26 shifts the arm 25 to substantially the position indicated in Fig. 9, so as to actuate the valve 15 to admit high pressure fluid to the right hand end of the cylinder 14 through the conduit 17, thus energizing the carriage in a reverse direction. This reverse energization of the carriage through the hydraulic cylinder 14 first stops the movement of the carriage to the right and then actuates the carriage for movement to the left. After a predetermined travel towards the left, as viewed in Figs. 1, 7 and 9, the finger 36 of the dog 19 engages the stop 34 of the valve shifting element and moves it to substantially the broken line position shown in Fig. 7. This movement of the element 26 shifts the arm 25 in a counter-clockwise direction, as viewed in Fig. 9, to actuate the valve 15 to admit high pressure fluid to the left hand end of cylinder 14 and energize it in a reverse direction. Such reverse energization first brings the carriage to rest and then actuates it for movement to the right. After a predetermined travel towards the right, equal to the previous travel in the same direction, the finger 37 of the valve actuating dog 18 again engages the stop 35 to shift the valve actuating element 26 and the cycle is repeated. In this manner the dogs 18 and 19 control the reciprocation of the carriage over the path C while the blade holding fixture 3 is at the grinding station adjacent the grinding wheel 5. Similarly, the dogs 27 and 28 control the reciprocation of the carriage while the blade holding fixture 4 is at the grinding station adjacent the grinding wheel 5.

A way 42 is formed along the front side of the carriage 1 to receive the dogs 18, 19, 27 and 28. This way has formed therein a T slot 43 which receives bolts 44 to secure the dogs in place. Accordingly, the dogs may be individually adjusted longitudinally with respect to the carriage so as to accurately determine the lengths and relative locations of the several paths of reciprocation of the carriage. Thus the pair of dogs 18 and 19 may be moved further apart than shown so as to increase the length of the path C over which the carriage reciprocates while the blade holding fixture 3 is adjacent the grinding wheel. Similarly, the dogs 27 and 28 may be shifted further apart so as to lengthen the path over which the carriage reciprocates while the blade holding fixture 4 is adjacent the grinding wheel.

The finger 36 of the dog 19 and the finger 39 of the dog 27 are pivotally mounted on spindles 45 and provided with upstanding arms 46. When the carriage is being reciprocated under the control of the dogs 18 and 19 with the blade holding fixture 3 adjacent the grinding wheel, the operator, by moving the arm 46 to substantially the position indicated by the broken lines of Fig. 7, can pivot the finger 36 in a counter-clockwise direction and withdraw it so as to avoid contact with the stop 34 of the valve shifting element 26. The valve 15 thus continues to supply fluid under pressure to the cylinder 14 after the carriage reaches its normal limit of movement for reciprocation over the path C with the fixture 3 at the grinding station, so that the carriage continues to move to the left to remove the blade holding fixture 3 away from the grinding wheel and advance the blade holding fixture 4 to the grinding station adjacent the grinding wheel. The carriage continues to advance to the left until the finger 38 of the dog 28 engages the stop 34 and shifts the element 26 to the left to reverse the valve 15, as previously described. Similarly, by means of the upstanding arm 46 on the finger 39, the latter may be withdrawn so as to avoid contact with the stop 35, and shift the carriage to the right beyond the normal limit of movement for reciprocation of the fixture 4 at the grinding station, thus moving fixture 4 away from the grinding wheel and advancing the blade holding fixture 3 to a position adjacent the grinding wheel.

After a blade has been ground on the fixture 4, for example, and the fixture moved away from the grinding station, the operator removes the ground blade from the fixture and replaces it with a fresh blade to be ground while another blade previously mounted on the fixture 3 is being carried back and forth across the abrading surface of the grinding wheel 5. After the grinding of the blade on the fixture 3 is completed, the operator, by moving the arm 46 and withdrawing the finger 36 so as to miss the stop 34, effects a shifting of the carriage so as to bring the blade holding fixture 4 with the fresh blade to be ground thereon, into operative position with respect to the grinding wheel 5. This same movement of the carriage withdraws the blade holding fixture 3 from the grinding wheel so that the operator can remove the ground blade therefrom and either reverse the blade so as to grind the opposite side thereof or replace it with a fresh, unground blade.

Since no grinding is being done while one blade fixture is withdrawn from adjacent the grinding wheel and another is brought into grinding position, it is desirable that the rate of travel or speed of the carriage be increased so as to save time. For this purpose a by-pass conduit 49 is connected in parallel with the conduit 22 around the throttle valve 23. The flow of fluid through the conduit 49 is controlled by means of a quick acting valve 50 actuated by upwardly extending rod 51. A member 52 (Fig. 8) is secured on the upper end of the rod 51 and carries a roller 53 which is engaged by a rapid traverse track or cam 54 depending from the way 42 between the dogs 19 and 27, as shown in Fig. 7. The member 52 is centrally apertured and straddles the angular portion 32 of the pivot arm 25 so that the roller 53 is normally disposed between the valve shifting element 26 and the front panel 31 of the supporting structure 32 about midway between the stops 34 and 35. The ends of the cam 54 are rounded as indicated at 55, to effect a relatively smooth or gradual depression of the rod 51 which actuates the valve 50. The relatively large quantity of high pressure fluid admitted through the conduit 49 to the valve 15 accelerates the velocity of the carriage 1 while one blade holding fixture is being withdrawn from operative position adjacent the grinding wheel and the other blade holding fixture is being advanced to the grinding wheel.

Desirably, a main control valve 56 is arranged to shut off the supply of fluid from the pump to the carriage control valve 15 and is actuated by a lever 57 mounted on the front panel 31 of the supporting structure. The rod 51 is guided by brackets 60 with which it has sliding engagement and is normally urged upwardly by a compression spring 61 which embraces the rod and bears against a collar 62 secured to the rod 51, the lower end of the spring bearing against one of the brackets 60.

The blade holding fixtures 3 and 4 are of similar construction and the description thereof will be made with reference to Figs. 12 to 16 and 19 which show details of fixture 4, and to Figs. 17 and 18 which show details of fixture 3. The various elements included in the fixture 3 are not identical with their counterparts in the fixture 4 but may be termed left handed parts while the similar elements of fixture 4 may be termed right handed parts.

Each of the blade holding fixtures comprises a pedestal member 65 supported on bed 66 of the carriage 1 and adjustably secured thereto by bolts 67 (Fig. 15) anchored in T-slots 68. A base 69 has a sliding dovetail connection 70 (Fig. 19) with the top of the pedestal 65 for horizontal adjustment thereof, transversely with respect to the direction of reciprocation of the carriage 1. This transverse adjustment is effected by means of a threaded rod 71 journaled at 72 (Fig. 15) at the front end of the pedestal 65 and extending longitudinally through a trench 73 formed in the pedestal. A block 74 is secured to the underside of the base 69 and threadedly receives the rod 71. Endwise movement of the rod 71 with respect to the pedestal 65 is prevented by an annular collar 75 formed on the rod 71 which engages one end of the journal 72 and an annular bearing washer 76 secured against the opposite end of the journal 72 by jamb nuts 77. The rod 71, beyond operator's side 78 of the carriage 1, is squared as indicated at 79 to receive a suitable tool for turning the rod when adjusting the base 69 transversely with respect to the pedestal and carriage. Desirably, graduations 80 are formed on the collar 75 to facilitate the accurate determination of the amount of the adjustment made in the base 69.

An upstanding bracket 81 is formed at the operator's end of the base 69 and is provided with a substantially vertical bearing surface 82, Fig. 12, against which is adjustably secured a footing member 83 of body portion 84.

The body 84 of the blade holding fixture is thus disposed above the base 69 and pedestal 65 and is supported cantilever fashion by the bracket 81 of the base. The footing 83 is slidable on the bearing surface 82 of the bracket 81 and a vertically disposed key 85 secured by screws 86 in a groove formed in the bracket, has sliding engagement in a groove formed in the bearing surface 82 to guide the body portion 84 and maintain the latter in proper alignment with the base and pedestal. An adjusting bolt 87, journaled in boss 88 formed on the bracket 81, has threaded engagement with a laterally extending block 89 screwed into the body portion 84 and extends through a vertically elongated slot 90 formed in the lower portion of the bracket 81. The body 84 of the blade holding fixture may be adjusted vertically by rotating the bolt 87, so as to elevate or lower the body portion with respect to the base and pedestal of the blade holding fixture and the bed 66 of the carriage 1. In order to tightly secure the body to the base 69, a pair of cap screws 91, having their heads bearing against the bracket 81, pass through vertically elongated slots 92 (Fig. 1) in the bracket 81 and are threadedly secured in the footing 83 of the body 84. The end of the body portion 84 opposite the footing 83 is supported by a stud 93 which extends upwardly from the base 69 and passes through a boss 94 formed on the body portion 84 of the blade holding fixture. A nut 95 above and below the boss 94 lock the latter to the stud 93.

Desirably, a gib 96 (Fig. 19) is interposed between the pedestal 65 and base 69 in a dovetail connection 70. This gib is laterally engaged by rods 97 threadedly received in the base 69 and arranged to bear against the gib when tightened by means of thumb wheels 98 secured on the outer ends of the rods. In this manner the base 69 can be locked in adjusted position with respect to the pedestal 65.

The body portion 84 has a central vertically extending bore 101 (Fig. 19) which receives a rotatable spindle 102. The spindle is journaled in top and bottom tapered roller bearing assemblies 103 and 104 respectively. The outer race of the bottom roller bearing seats in a counterbore 105 of the bore 101 and the inner race thereof embraces the spindle 102 and seats against a circumferential collar 106 formed thereon adjacent the lower end of the spindle. The outer race of the upper roller bearing 103 seats in a counterbore 107 at the upper end of the bore 101 and the inner race of the bearing is adjustably held by a pair of lock nuts 108. Thus by means of the adjustable lock nuts and the collar 106 the inner races of the top and bottom roller bearings can be drawn together so as to tighten the journals and prevent lateral play or movement of the spindle 102 in the body 84 of the blade holding fixture. This feature is of considerable importance since it is essential that the blade be rigidly held during the grinding thereof so that the scallops formed along the cutting edge of the blade are uniform and evenly spaced.

A reduced diameter portion 109 at the upper end of the spindle 102 receives a blade holding drum or head 110, to be later described, which is supported on a shoulder 111 formed at the bottom of the reduced diameter portion 109 of the spindle. A star wheel 112 surmounts the spindle 102 and is threadedly secured thereto, bearing against an upper portion of the head 110 to secure the latter against rotation on the reduced diameter portion 109. A number of shims 115 may be disposed between the head 110 and circumferential shoulder 111 of the spindle 102 so as to provide fine, accurate vertical adjustment of the head 110. The star wheel 112 prevents rotation of the blade holding drum on the spindle and affords a ready means by which the operator can rotate the drum and spindle in loading the drums with a blade to be ground.

A trough 116 surmounts the body 84 of the blade holding fixture and has a bottom portion 117 which slopes downwardly and away from the blade holding head 110. The central portion of the trough rests upon and is secured to the body 84 and is provided with an upwardly directed circular flange 118 which is received in an annular channel or groove 119 formed in the bottom of the head 110, see Fig. 18. The flange 118 and channel 119 serve as a trap to prevent grinding fluid used in the grinding of the blade from flowing underneath the head 110 into the bearings 103 and 104 and other moving parts of the blade holding fixture. The trough 116 has upwardly extending end walls 120 and a side wall 121. The side of the trough disposed adjacent the grinding wheel 5 and opposite the side wall 121 is open, as shown in Fig. 15, to permit the ready discharge of grinding fluid therefrom.

A pair of spaced parallel peripheral abutments 122 and 123 are formed circumferentially about the outer margin of the drum 110 and in concentric relation with respect to the axis of the spindle 102. These abutments serve as a backing for a relatively thin flexible blade 124, which, during the grinding of the latter, is bent or deformed into an arcuate shape around the drum 110. An upwardly directed circumferential shoulder 125 is formed on the blade holding drum 110 adjacent the bottom abutment 123 to support the bottom or non-cutting edge of the blade 124 during the grinding of top or cutting edge 126 of the latter. The top abutment 122 is arranged to engage the concave side of the blade 124 below the blade edge 126 which is to be abraded by the grinding wheel 5 and at a region of the blade spaced from the region engaged by the abutment 123. In this manner the top abutment 122 avoids contact with the grinding wheel while serving as a reinforcement for the blade in the grinding area.

As shown in Fig. 18, the top abutment 122 is formed on a radially extending fin or flange 127 and a circumferential channel or groove 128 is disposed between the top and bottom abutments 122 and 123. This channel is normally covered by the blade 124 when the latter is in position for grinding and a plurality of apertures 129 are formed in the flange 127 so as to admit grinding or cooling fluid to the channel 128 during the grinding operation. The cooling liquid thus admitted to the channely remains in contact with the concave side of the blade 124 to cool the latter.

Adjacent the flange 127 and on the top surface of the drum or head 110 is formed an upwardly directed circumferential flange 130 which extends above the level of the top edge 126 of the blade 124 and serves to direct cooling liquid into the apertures 129.

A central annular channel 133 is formed in the top of the drum 110 about the portion of the latter which is engaged by the downwardly directed shoulder of the star wheel 112. This channel connects with a segmental cut-away portion 134 (Fig. 17) which extends through the periphery of the head. A pair of blade holding arms 135 and 136 are disposed in the cut-away portion 134 and extend radially from rings 137 and 138 respectively, which ride in the channel 133 about the central portion of the head, being retained therein by the star wheel 112. The arms 135 and 136 are of such a length that their ends 139 and 140 respectively describe arcs of sumstantially equal radius with the abutments 122 and 123 and are provided with removable blade holding pins 141 and 142 respectively. These pins are received in drill holes in the arms and secured by set screws 143 which permit adjustment or replacement of the pins as desired. A laterally extending flange 144 formed on the arm 135 is disposed against the horizontal bottom 145 of the cut-away portion 134 and is provided with an arcuate slot 146 concentric with the axis of the spindle 102. A tightening screw 147 extends through the slot 146 and is threaded into the head 110 to retain the arm 135 in adjusted position. A helical compression spring 148 has its ends seated in sockets formed in radial side walls 149 of the cut-away portion 134 and one side of the arm 136 to urge the arm toward a stop pin 150 secured in the floor 145 of the cut-away portion and maintain a suitable tension on the blade being ground.

In order to grind a scallop or serration in the edge 126 of the blade 124, the head 110 must be secured against rotation as the carriage and fixture carry the blade across the peripheral abrading surface of the grinding wheel. A succession of scallops or serrations are ground in the blade by rotating the head or drum 110 a predetermined amount after each grinding operation. This control of the blade holding head is effected by means of an index wheel 153 (Fig. 19) received on a reduced diameter portion 154 of the spindle 102 at the lower end of the latter. The index wheel abuts against the collar 106 and is secured in place by a plurality of axially extending screws one of which is indicated at 155. These screws have their heads recessed in the wheel 153 and are threadedly engaged in apertures formed in the collar 106. A multiplicity of equally spaced teeth 156 are formed about the periphery of the index wheel 153 in concentric relation with respect to the axis of the spindle 102. The teeth have radially disposed faces 157 (Fig. 16) and inclined faces 158 to insure accuracy in indexing, as will later appear. At the bottom of the body 84 and extending laterally therefrom in a radial direction with respect to the spindle 102 is a housing 159 (Fig. 19) which has slidably mounted for reciprocation therein an indexing pawl 160. This pawl is movable toward and away from the toothed periphery of the index wheel 153 and is provided with a wedge-shaped nose 161 (Fig. 16) engageable between adjacent teeth of the wheel 153. One face 162 of the nose 161 is parallel to the line of reciprocation of the pawl 160 and is thus substantially parallel with the radial faces 157 of the teeth 156 so as to bear flatwise thereagainst. Face 163 on the opposite side of the nose 161 from the face 162 is disposed at an angle with respect to the direction of reciprocation of the pawl 160 and is engageable with the angularly disposed faces 158 of the ratchet teeth 156. Helical compression spring 164, set in a longitudinal bore 165 formed in the body of the pawl, normally urges the pawl 160 to the left as viewed in Figs. 12 and 16 so that the inclined face 163 on the nose 161 has a wedging action with the inclined face 158 of one of the ratchet teeth 156 to hold the radial face 162 of the pawl nose 161 against the radial face 157 of the next adjacent tooth of the indexing wheel. The spring 164 seats against a conical end formed on an adjusting screw 166 threadedly received in a removable cap 167 at the end of the housing 159. A tapered gib 168 is disposed between one side of the pawl 160 and the adjacent wall of the housing 159 to prevent lateral shifting of the pawl. One end of this gib extends through the cap 167 and is provided with a notch 169 which receives a peripheral portion of a knurled adjusting wheel 170, carried on the end of a threaded rod 171 screwed into the cap 167, retaining the gib 168 in adjusted position.

A pin 172 having a press fit in a drill hole in the pawl 160 extends through an elongated slotted opening 173 formed in the under side of the housing 159 and is received in a socket of a lever 174 carried by a stud 175 (Fig. 15) pivotally mounted in a boss 176 formed on the housing 159. By pivoting the lever 174 away from the fixture in a counter-clockwise direction, as viewed in Fig. 12, the pawl 160 may be withdrawn from the indexing wheel 153 so that the operator can rotate the blade carrying head or drum 110 by means of the star wheel 112.

A ring member 179 is mounted for oscillatory rotative movement on a cylindrical portion 180 (Fig. 19) formed at the lower end of the body 84. The top surface of the ring member 179 abuts against a circumferential shoulder 181 of the body and the ring member is retained on the cylindrical portion 180 by means of a removable flange member 182, attached to the lower end of the body 84 by means of a plurality of screws, one of which is indicated at 183.

Figure 19:
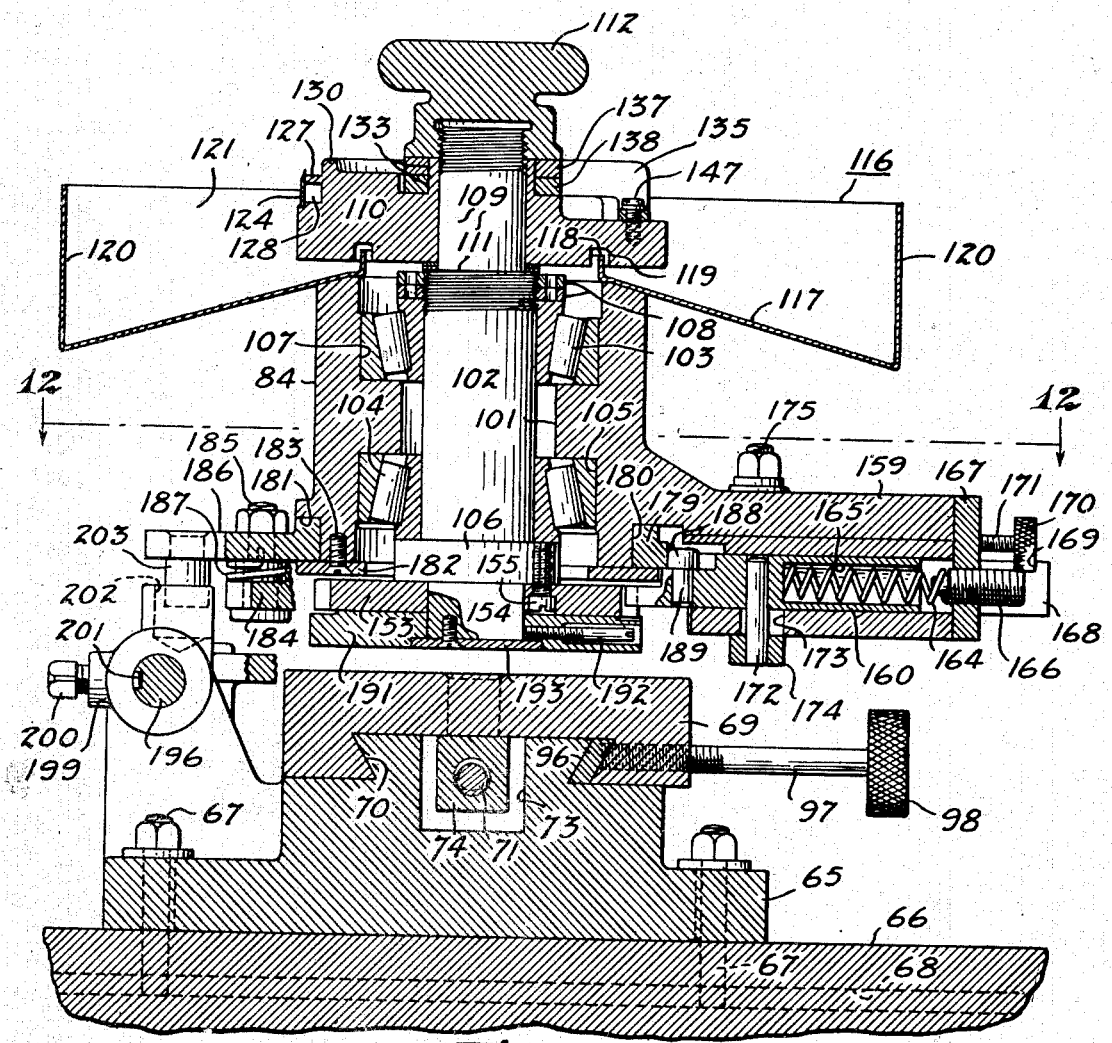
Fig. 19 is a vertical sectional view, with parts removed, taken substantially on the line 19—19 of Fig. 12.

A pawl 184, pivoted to an arm 186 of the ring member 179, is pressed by means of a coil spring 187 against the toothed periphery of the index wheel 153. Upon each movement of the ring member 179 in a counter-clockwise direction, as viewed in Fig. 12, the pawl 184 rotates the index wheel 153 and spindle 102. Thus the blade drum or head 110 of the fixture 4 is rotated in a counter-clockwise direction as viewed from above, and in a corresponding manner the blade holding drum of the fixture 3, shown in Fig. 17, is rotated in a clockwise direction as indicated by the arrow. In order to withdraw the indexing pawl 160 from between adjacent teeth of the index wheel 153 during the rotation of the latter by the ratcheting pawl 184, a circumferential cam 188 (Fig. 12) is formed on the ring member 179 opposite the pivot 185 for the pawl 184. As shown in Fig. 19, the cam 188 engages a pin 189 which has a press fit in the pawl 160 and as the ring member 179 is rotated the cam forces the pawl 160 to the right so as to withdraw the nose 161 thereof from between adjacent teeth 156 of the index wheel.

As will later appear, it is desirable that after a predetermined number of rotative movements imparted to the index wheel 153, spindle 102 and blade holding head 110, by the ratcheting pawl 184, continued oscillation of the ring member 179 is ineffective to further rotate the parts mentioned. For this purpose a tooth blanking element 190 (Figs. 13 and 14) is secured to a disk 191 adjustably carried on the end of the reduced diameter bottom portion 154 of the spindle 102. As shown in Fig. 19, the disk 191 underlies the index wheel 153 and is secured against rotation on the spindle by means of a radially disposed set screw 192. A circular cap 193, secured on the end of the spindle 102, retains the disk 191 in place when the set screw 192 is released. The tooth blank 190 extends upwardly from the periphery of the disk 191 (which is of but slightly greater diameter than the indexing wheel 153) and is disposed in overlying relation with respect to a number of the teeth 156. Accordingly, as the spindle 102 and related parts are rotated by the ratcheting pawl 184, the tooth blank 190 approaches the pawl and finally underlies the same, as shown in Fig. 14, at a predetermined position of the blade holding drum or head 110 with respect to the grinding wheel 5 so that further reciprocation of the pawl 184 is ineffective to rotate the indexing wheel 153, the pawl merely sliding over the outer surface of the tooth blank 190.

The pawls and the cam carrying ring members 179 of the blade holding fixtures 3 and 4 are actuated by reciprocating rods 196 (Fig. 12) which are mounted for longitudinal sliding movement in the apertured end of brackets 197 and 198 extending laterally from the pedestals 65. Fittings 199, longitudinally adjustable on the reciprocable rods 196 by means of adjusting screws 200 seating in longitudinal grooves 201 of the rods, have elongated openings 202 in their upper sides which receive depending pins 203 (Fig. 19) secured in the arms 186 of the respective ring members 179.

A helical compression spring 204 is disposed about each of the reciprocating rods 196 at the operator's end thereof to normally urge the rods in a direction away from the operator. One end of each of the springs 204 rests against the rod receiving portion of the bracket 197 and the opposite end of each of the springs abuts against an adjustable collar 205 threadedly received on a threaded portion 206 of the rod 196 and secured in adjusted position by a set screw 207. Collars 208 on the ends of the rods 196 limit the movements of the latter by engagement with the outside of the rod receiving portions of the brackets 197 and 198.

Reciprocation of each of the rods 196 is effected through the pair of arms 209 and 210 carried by a pivot stud 211 journalled in a bracket 212 formed on the rear side of the pedestal. The free end of each of the arms 209 is formed with a yoke 213 which straddles flattened portion 214 of the rod 196, thus preventing rotation of the rod in the brackets 197 and 198; elongated slots 215 formed in the yokes receive pins 216 secured in the rods 196.

An annular collar 219 is formed on the stud 211 and rests on the top of the boss 212. By means of a tightening nut 220 and a lock washer 221, the arm 209 is forced against the collar 219 so as to prevent rotation of the arm relative to the stud 211. The portion of the stud which projects from the bottom of the boss 212 rotatably receives the arm 210, which is retained thereon by a lever 222 (Fig. 15) secured against rotation on the stud by a taper pin 223. An upwardly projecting pin 224 formed on the lever 222 is engageable with a finger 225 formed on the arm 210. A helical compression spring 226 seated in sockets formed on the arm 210 and lever 222 normally retains the finger 225 in engagement with the pin 224 as shown in Fig. 12.

As the carriage 1 is reciprocated on the supporting structure 2 with one of the blade holding fixtures at the grinding station adjacent the grinding wheel 5, a roller 227 on the end of the arm 210 engages a V-shaped cam member 228 secured to the supporting structure substantially in the plane of rotation of the grinding wheel. As each of the blade holding fixtures is advanced into operating position adjacent the grinding wheel 5 the roller 227 associated therewith rides up one face and over crest 229 of the cam member 228. For example, blade holding fixture 4 is shown in Fig. 12 with the spindle 102 substantially on the center line of the grinding wheel, and in reaching this position it moves from right to left relative to the cam member 228, the roller 227 first engaging and riding up the face 230 of the cam member to substantially the position indicated by the broken lines, where it clears the crest 229 of the cam and then moves under the influence of the spring 226 to the full line position shown. During this movement of the arm 210 the arm 209 remains substantially stationary (because of the collar 208 abutting against the bracket 197) and the finger 225 moves away from the pin 224 while the arm 210 pivots on the stud 211 as the spring 226 is compressed.

Upon movement of the carriage 1 to the right, as viewed in Figs. 1, 10, 12, and 19, the roller 227 engages the inclined face 231 of the cam member 228 so that the arm 210 is pivoted on the stud 211, and the finger 225 engages the pin 224 so that the lever 222 and arm 209, which move as a unit, are likewise pivoted to move the rod 196 toward the operator, causing a rotative movement of the ring member 179 about the body 84 of the blade holding fixture. This movement of the ring member withdraws the indexing pawl 160 by means of the cam surface 188, as previously described, and effects a rotation of the spindle 102, and blade holding drum 110 of a predetermined amount, by means of the ratcheting pawl 184. As the blade holding fixture is moved away from the grinding station the roller 227 on the arm 210 again rides over the crest 229 of the cam member 228 causing a longitudinal movement of the rod 196 against the compression of the spring 204.

The grinding wheel or abrader 5 and the actuating motor 6 are mounted on a table 234 slidably carried on the supporting structure 2 by means of a dovetail connection 235 (Fig. 1) for movement toward and away from the carriage 1, as desired. This movement is effected by means of a threaded shaft 236, (Fig. 2) mounted for rotation in the supporting structure 2 and threadedly received in the end of a member 231 depending from the table 234. The shaft 236 is secured against endwise movement in the supporting structure and one end thereof which projects through the front panel 31 of the supporting structure has secured thereon a crank wheel 238 by means of which the operator can effect rotation of the shaft for adjustment of the position of the table 234. A clamping block 239 is carried by a threaded rod 240 rotatably mounted in the table 234, and, upon being drawn upwardly against shoulders 241 formed on the supporting structure, locks the table 234 in adjusted position. A collar 242 on the rod 240 prevents vertical or longitudinal movement of the latter relative to the table 234 and the rod is provided with a squared end 243 for receiving a suitable turning tool. As the grinding wheel 5 becomes worn, the adjusting handwheel 238 can be used to advance the wheel toward the table 1 so as to be in correct position at the grinding station relative to the blade holding drums 110 on the fixtures 3 and 4. A corresponding adjustment is available, as previously described, by means of the rod 71 which moves the base of the fixtures relative to the carriage.

A driving connection between the motor 6 and the grinding wheel 5 is effected by means of a belt 244 and the grinding wheel is arranged to rotate on an axis substantially parallel to the direction of reciprocation of the carriage 1 so that during a grinding operation a blade mounted on one of the blade holding drums is carried across the peripheral, radially outwardly directed, crowned abrading surface of the grinding wheel.

A nozzle 245, which receives cooling or grinding liquid through conduit 246 from a pump and reservoir (not shown) carried by the supporting structure, is arranged to direct a stream of the liquid onto the blade being ground and the periphery of the grinding wheel 5, the latter being rotated in the direction of the arrow in Fig. 2. This cooling liquid flows over the outer surface of the work being ground, and by means of the upstanding flange 130, the cooling liquid is directed to flow through the upwardly opening apertures 129 and into the channel 128 where the cooling liquid contacts the inner side of the blade being ground. As shown in Fig. 18, the abutments 122 and 123 are relatively narrow and contact but a minor portion of the rear or inside surface of the blade being ground, leaving the major portion of the blade surface exposed to the cooling liquid. Furthermore, the abutment 122 is disposed closely adjacent the edge of the blade being ground to support the same and resist deflection thereof. In this manner the major portion of the inside surface and all of the outside surface of the relatively thin flexible blade are substantially submerged in the cooling liquid during the grinding operation so that the generated heat is quickly and effectively carried off by the circulating coolant, and burning of the relatively thin metal blade is avoided.

Referring to the diagram shown in Fig. 10, the movement of the carriage 1 during operation of the machine will be described by indicating the various positions taken by the rods 196 which actuate the ratcheting pawls 184. In this figure various parts previously described and associated with the blade holding fixture 3 are identified by suffixing the numeral —3 after the identifying numeral for the part. Similarly, the parts associated with the blade holding fixture 4 are indicated by the numeral —4 suffixed to the part identifying number.

When the carriage 1 is at its extreme limit of movement to the right (substantially in the position indicated by the full lines of Fig. 1) the rods 196—3 and 196—4 of the blade holding fixtures 3 and 4 respectively, are at 252 and 253 respectively, indicated by the solid lines of Fig. 10, the spindle 102 of the blade holding fixture 3 having moved beyond centerline 247 of the grinding wheel 5 a distance equal to about one-half the length of a scallop or serration. Upon movement of the carriage to its extreme limit of movement to the left (indicated by the broken lines of Fig. 1) the rod 196—3 (Fig. 10) of the blade holding fixture 3 takes the position indicated by line 250 and the rod 196—4 takes the position indicated by line 251. Thus the movement of the rod 196—4 is indicated by the distance A between lines 251 and 253, while the movement of the rod 193—3 is indicated by the distance B, between lines 250 and 252. The distances A and B are, of course, equal to one another and controlled by the distance between the dogs 18 and 28.

While the blade holding fixture 3 is at the operating or grinding station the carriage 1 is reciprocated over a path, the limits of which are indicated by the line 252, previously mentioned, and a line 254 which is removed from the line 252 at a distance C toward the line 250. The distance C, which represents the length of the work and ratcheting strokes of the carriage and fixtures is controlled by the dogs 18 and 19 for the fixture 3, and by the dogs 27 and 28 for the fixture 4. Usually the distance C is the same for both fixtures, and accordingly, while the description of the movements of fixtures at the grinding station is made with specific reference to fixture 3, it is to be understood that the movements of the fixture 4 are similar, but take place in reverse directions on the opposite side of the grinding wheel from the movements of the fixture 3.

As shown in Fig. 17, C designates the distance from the location of the centerline of the fixture 3 when the latter is at the end of a grinding or work stroke, indicated at 255, to the location of the centerline of the fixture 3 when the latter is at the end of a ratcheting stroke, indicated at 256. These positions of the fixture centerline correspond to the positions 252 and 254, respectively, of the rod 196—3 (Fig. 10). When the drum 110 of the fixture 3 is in the position shown in Fig. 17, with respect to the grinding wheel 5, the rod 196—3 is in the position indicated by the line 252 (Fig. 10). As the spindle and blade holding drum centerline moves from 256 to 255 (Fig. 17) the blade carrying head or drum 110 is carried over a work stroke during which the cutting of a serration or scallop in the blade 124 takes place. After each work or grinding stroke, and while the spindle centerline is moving from 255 to 256, the spindle 102 is rotated by engagement of the roller 227—3 with the face 230 of the cam member 228, an amount sufficient to bring the next adjacent portion of the blade being ground into position to be abraded by the grinding wheel 5 on the next work stroke. On account of the clearance between the roller 227—3 and cam face 230 at the completion of a work or grinding stroke, the centerline of the spindle or blade holding fixture moves a material distance away from the line 255 before any rotation of the spindle occurs. For example, by suitable adjustment of the parts the spindle centerline may reach a position such as indicated by line 257 (Fig. 17) before the cam roller 227—3 engages the cam surface 230 and starts the ratcheting of the spindle. In this manner rotation of the blade carrying drum 110 while the blade is in contact with the grinding wheel 5 is avoided. Accordingly, on the return or ratcheting stroke the spindle travels a distance D before any ratcheting occurs and the entire ratcheting or rotational movement of the drum 110 occurs while the spindle or blade holding fixture centerline moves a distance E.

In order to produce a series of scallops or serrations on a blade, the latter is mounted on one of the blade holding drums 110 so that the portion drawn across the peripheral abrading surface of the grinding wheel 5 is bowed or bent into arcuate shape. The body 84 of the blade holding fixture is adjusted vertically so that the blade is supported with the top or cutting edge 126 thereof disposed in a horizontal plane materially below the horizontal center line of the grinding wheel 5, which is indicated by the numeral 258 (Fig. 18). In this manner the portion of the abrading surface of the rotating grinding wheel which contacts the blade is disposed, because of the peripheral curvature of the wheel, at an angle to the plane of the blade, which corresponds to the desired bevel on the finished blade.

During the operation of a machine of the character described above for the commercial manufacture of blades having scalloped edges, such for example as relatively thin flexible blades for reciprocating bread slicing machines, the operator sets the motor 6 in operation to drive the grinding wheel 5 at a relatively high peripheral speed and starts the pump 21 to supply high pressure fluid for actuating the piston 13 in the hydraulic cylinder 14. The carriage 1 is moved to the left as viewed in Fig. 1, to substantially the dotted line position shown and a thin flexible blade blank is fixed to the blade holding drum 110 of the blade holding fixture 3. As shown in Fig. 17, the blade blank is shorter than the circumference of the drum 110 but of greater length than the abutments 122 and 123 so that the ends of the blade blank project beyond the ends of the abutment across portions of the cut-away portion 134. Holes 259 are formed in the blade blanks adjacent the ends thereof and are received on the pins 141 and 142 to secure the blade to the drum 110. A partially ground blade or blade blank is secured on the drum by placing one of the holes 259 over the pin 141 on the arm 135 and bowing and drawing the blade around the abutments 122 and 123 so that the rear or bottom edge thereof seats against the circumferential shoulder 125 of the drum. The operator then pivots the arm 136, compressing the spring 148, and locates the pin 142 in the hole 259 at the opposite end of the blade blank. In this manner the blade is tensioned and held in bent form tightly against the shoulders or abutments 122 and 123 by the force of the spring 148.

The distance from one end of the blade blank 124 or the hole 259 which is received on the pin 141 to the first scallop or serration is determined by the position in which the operator sets the head 110 before starting the grinding operation.

When setting up the machine for grinding a certain type or size of blade, a blank 124 is placed about the head 110 and the latter rotated so that upon movement of the fixture to carry the blade blank across the crowned face of the grinding wheel, the first scallop will be formed approximately in the position desired. Final adjustment of the position of the blade blank about the drum is effected by means of the elongated slot 146 and screw 147 which permit variation of the position of the arm 135. Upon thus determining where the center of the first scallop in the blade blank will be ground, the operator can make a temporary gauge mark 260 on the head of the drum which indicates the portion of the drum which is to be turned toward the grinding wheel at the beginning of each grinding operation so as to properly locate the first scallop. Each time the operator sets the fixture to grind a fresh blade blank or to grind the reverse side of a previously ground blade blank, he rotates the drum 110 after releasing the indexing pawl 160 by means of the hand lever 174 to dispose the gauge mark 260 parallel to the plane of rotation of the grinding wheel.

Upon opening the main control valve 56, the hydraulic cylinder 14 moves to the right, as viewed in Fig. 1, so that the blade holding fixture 3 with the unground blade blank in place is advanced to the grinding station adjacent the grinding wheel 3, and across the face of the wheel, substantially to the full line position shown in that figure. The limit of movement is controlled by the finger 37 of the dog 18 which actuates the valve 15 through the valve shifting element 26 to reverse the hydraulic cylinder mechanism and move the carriage to the left.

During the movement of the carriage to the right the drum 110 is held rigidly against rotation by means of the indexing pawl 160. During the movement to the left a distance C, the roller 227—3 engages the face 230 of the cam 228 and is moved about the pivot stud 211 shifting the rod 196—3 longitudinally in the brackets 197 and 198 to substantially the broken line position 254 (Fig. 10). This movement of the rod 196—3 rotates the ring member 179 to release the index pawl 160, as previously described, and to rotate the indexing wheel 153 in a clockwise direction as viewed in Fig. 10, thus rotating the spindle 102 and drum 110 to advance a successive portion of unground blade blank into operative position with respect to the grinding wheel 5.

Upon reaching its limit of movement to the left, as controlled by the finger 36 of the dog 19, the carriage 1 is reversed and moved to the right to carry the next portion of the blade 124 across a portion of the peripheral abrading face of the grinding wheel 5. During each work stroke of the carriage and blade holding fixture, the indexing pawl 160 engages the indexing wheel 153 to secure the blade holding drum against rotation during the grinding operation. The drawing of the blade across a portion of the peripheral abrading face of the grinding wheel, tends to rotate the blade holding drum 110 of the blade holding fixture 3 in a counter-clockwise direction, as viewed in Fig. 10. In order to more effectively resist this torque the indexing pawl 160 is arranged so that the radial faces 157 of the teeth 156 on the index wheel 153 are engaged by the radial face 162 on the indexing pawl 160. Similarly, the teeth 156 and indexing pawl 160 of the blade holding fixture 4 are arranged so that the radial face 162 on the nose of the pawl resists the rotation of the blade holding fixture spindle induced during the grinding operation (see Fig. 16). As shown in Fig. 10, the blade holding drum 110 of the blade holding fixture 4 tends to roll in a clockwise direction during the grinding operation.

The reciprocation of the carriage 1, with the blade holding fixture at the grinding station, continues under the control of the dogs 18 and 19, a scallop being ground on each movement to the right and the spindle being rotated or ratcheted at each movement of the fixture to the left, until the tooth blank 190 is rotated into a position in underlying relation with respect to the ratcheting pawl 184 to prevent the latter from engaging succeeding teeth of the indexing wheel (see Fig. 14). In this manner further rotation of the spindle 102 and blade holding head 110 is arrested after the grinding of a predetermined number of scallops on the blade 124. In setting up the machine the disk 191 for the tooth blank 190 is adjusted by means of the set screw 192 so as to engage and deflect the pawl 184 when the desired number of scallops have been ground on the blade.

While a blade blank is being ground on the blade holding fixture 3 the blade holding fixture 4 is disposed at a distance from the grinding station, as shown in Fig. 1, and the operator attaches a blade blank thereto and positions the head 110 with the gauge mark 260 set to grind the first scallop when the blade holding fixture 4 is advanced to the grinding station. In the event that the grinding of the last scallop is completed on the blade carried by the fixture 3 before the operator is ready to shift the carriage, the tooth blank 190 prevents further rotation of the spindle 102 by the pawl 184 and prevents the grinding of additional scallops on the blade blanks.

When the operator is ready, the arm 46 on the dog 19 is moved so that the finger 36 misses the stop 34 and the blade holding fixture 3 moves away from the grinding station. As soon as the rod 51 is depressed by the rapid traverse cam 54, the bypass valve 50 is opened to supply additional high pressure fluid to the hydraulic cylinder 14 and move the carriage to bring the blade holding fixture 4 to the grinding station at a relatively high rate of speed. Before the blade 124 on the drum of the fixture 4 engages the abrading surface of the grinding wheel, the rod 51 is released by the rapid traveling cam 54 to close the bypass valve 50 so that the carriage 1 slows down to normal speed for grinding the first scallop.

While the blade blank carried by the fixture 4 is being ground at the grinding station, the operator removes the blade, which has just been ground, from the drum of the blade holding fixture 3. This blade, which has had one operation performed thereon at the grinding station, has an appearance resembling that illustrated in Figs. 3 and 4 upon being permitted to resume its normal straight line shape. At each pass of the blade across the face of the grinding wheel, an arcuate tapered edge 261 is formed. Along the top edge 126 of the blade are formed a series of spaced lands 262 which separate the scallops from one another. The operator then reverses the blade and secures it on the drum 110 so that it is bowed or bent in the opposite direction from that of the first grinding operation. After the reversed blade blank has been advanced to the grinding station on the blade holding fixture and reciprocated across the peripheral abrading surface of the grinding wheel, the scallops are completed and the blade, when removed from the drum 110 and allowed to assume its normal straight line position, appears as indicated in Figs. 5 and 6. As shown in these figures, arcuate beveled edges 263 are formed along the cutting edge of the blade on the opposite side thereof from the edges 261. The juncture of the beveled edges 261 and 263 forms a series or succession of scalloped or curved cutting edges 264 which are substantially continuous along the cutting edge of the blade and rise at substantially uniform intervals to a series of peaks or points 265 which are disposed in a substantially straight line.

The blade holding fixtures 3 and 4 are alternately advanced to the cutting station adjacent the grinding wheel and reciprocated across different portions of the crowned face of the latter and then moved away from the grinding wheel so that the operator can remove the ground blade from the blade holding drum and either reverse the blade for grinding the opposite side thereof or, in the event the blade has been ground on both sides, to replace it with a fresh unground blade blank. The grinding wheel is in substantially continuous useful operation, since, while one blade fixture is being reloaded, the other blade holding fixture is being reciprocated across the grinding wheel at the grinding station. Accordingly, by the intermittent and alternate use of a plurality of blade holding fixtures the production of a single grinding wheel can be materially increased.

The carriage movement is limited by a suitable adjustment of the dogs 18 and 28 so that on each grinding or work stroke the bowed parts of the blades carried by the fixtures 3 and 4 which contact the grinding wheel are carried completely past the center 271 of the peripheral abrading surface of the rotating grinding wheel but not beyond the side of the grinding wheel. Preferably, the dogs are located so that the movement of the carriage is arrested when the centers of the fixtures move beyond the center 271 of the grinding wheel a distance about one-half the distance between successive points 265 of the blades, which is one-half the length of the scallops or serrations being ground. Thus, the portion of the blade blank on the fixture 3 in which a scallop is ground is carried completely past the center 271 of the crowned abrading surface of the wheel and contacts a portion F of such abrading surface. Similarly, a blade mounted on the fixture 4 contacts a portion G of the abrading surface of the wheel. The portions F and G are each narrower than the grinding wheel 5, so that neither the blades carried by the fixture 3 nor the blades carried by the fixture 4 contact the whole peripheral abrading surface of the wheel.

At the center of the wheel periphery is a portion H of the grinding surface which is common to both the portions F and G. This operation of the apparatus has an advantageous effect in dressing the grinding wheel so that the latter remains true and uniform and continuously forms scallops of high accuracy.

Figure 20:
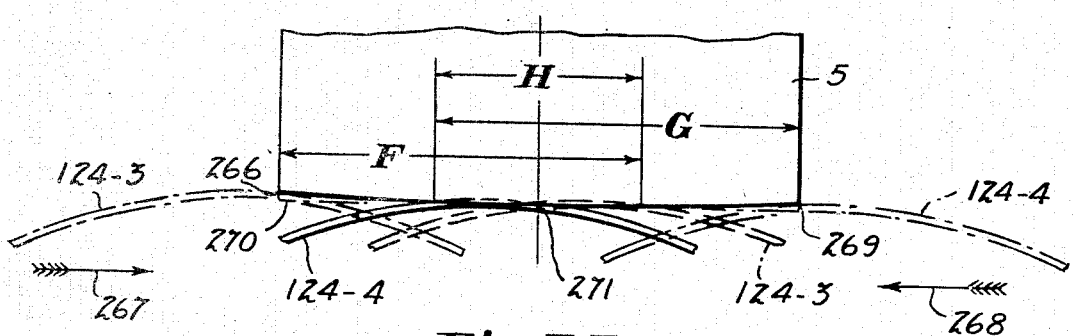
Fig. 20 is a diagrammatic view showing various positions of blades with respect to the grinding wheel, and illustrating the self dressing characteristics of the grinding wheel and related apparatus.

In Fig. 20 is diagrammatically illustrated the relationship between the blades and the peripheral abrading surface of the grinding wheel during the grinding operation. As a blade 124—3, carried by the fixture 3, approaches the rotating grinding wheel 5 in the direction of arrow 267, initial contact occurs at a corner 266 of the grinding wheel and the heaviest cut takes place at this point. As the movement of the blade holding fixture carries the portion of the blade being ground toward and beyond the center 271 of the grinding wheel over the portion F of the abrading surface, the grinding continues. While the blade is against the portion H of the grinding wheel, the abrading action is relatively light and in the nature of a dressing operation to remove burrs and to "finish" the beveled edge surface 261 or 263 as the case may be. During the movement of the blade holding fixture over the return or ratcheting stroke, the taper or "dress" of the abrading surface of the grinding wheel effects a gradual withdrawal of the blade 124—3 from the grinding wheel to complete the dressing or finishing operation on the blade. As previously mentioned, the rotation of the head 110—3, so as to present a succeeding portion of the blade to the grinding wheel, commences before the centerline of the spindle 102 clears or moves past the edge or corner 266 of the peripheral grinding wheel surface.

In a similar manner a blade 124—4 carried by the blade holding fixture 4, approaching the grinding wheel in the direction indicated by arrow 268, initially engages a corner 269 of the grinding wheel 5 where the cutting is started. As the blade 124—4 moves toward and beyond the center 271 of the grinding wheel over the portion G thereof, the grinding action continues, and in the portion H of the grinding wheel surface the dressing and finishing action occurs.

It is important that during the grinding operation the portion of the blade blank in contact with the wheel 5 be carried beyond the center or crown of the latter so as to form scallops or serrations of uniform character. Hence, on each grinding or work stroke the centerline of the spindle 102 must move past the center 271 of the abrading surface of the wheel.

The effect of alternately grinding different blades by moving the latter across the peripheral abrading surface of the grinding wheel from opposite sides of the wheel is to wear the peripheral surface of the grinding wheel to a curved shape such as that which is illustrated in somewhat exaggerated form in Fig. 20. During the operation of the apparatus substantially the same number of blades are ground on the fixture 3 as on the fixture 4 so that the portions F and G are subjected to substantially the same abrading action or wear and the entire crowned peripheral abrading surface of the grinding wheel 5 remains substantially unchanged over a long period of operation except for decrease in diameter. Because of the portion H of the peripheral grinding surface of the wheel 5 being common to both portions F and G, the latter portions blending smoothly into one another and after a period of operation the wear on all portions of the peripheral abrading surface is substantially uniform. Thus, while the most intensive grinding may occur at the corners 266 and 269 when the grinding wheel is new and substantially straight across its peripheral abrading surface, as indicated by the broken line 270 of Fig. 20, the corners, after a period of operation, become worn away as shown, so that the grinding action may be more uniform over all portions of the abrading surface traversed by each blade, except at the center of the wheel where the portion H of the abrading surface is contacted by blades or both fixtures and hence has a relatively lighter abrading action than the marginal portion of the abrading surface.

The present invention thus provides a novel apparatus for grinding thin flexible blades in which a single grinding wheel can be intermittently brought into abrading relation with respect to cutting blades carried by a plurality of blade holding fixtures so that while a blade is being ground in one fixture another blade can be removed from another fixture and replaced by a fresh unground blade blank.

What I claim is:

1. In a machine for grinding serrations in the cutting edges of elongated thin flexible blades, a grinding wheel having a peripheral abrading surface, means for rotating the wheel, a movable table in proximity to the wheel, a plurality of blade carrying fixtures mounted on the table for movement therewith, each fixture including a member for holding a blade during the grinding thereof, and means for moving the table to bring the several fixtures successively to a grinding station adjacent the abrading surface of the wheel, said moving means including means for reciprocating each blade holding member to repeatedly draw the blade held thereby across the abrading surface of the wheel while such member is at the grinding station.

2. In a machine for grinding serrations in the cutting edges of elongated thin flexible blades, a grinding wheel having a peripheral abrading surface, means for rotating the wheel, a movable table in proximity to the wheel, a plurality of blade carrying fixtures mounted on the table for movement therewith, each fixture including a member for holding a blade during the grinding thereof, means for moving the table to bring the several fixtures successively to a grinding station adjacent the abrading surface of the wheel, means for reciprocating each blade holding member across the abrading surface of the wheel while such member is at the grinding station, and means for intermittently moving said member in synchronization with the reciprocation thereof to successively present different portions of the blade held thereby to the abrading surface.

3. In a machine for grinding serrations in the cutting edges of elongated thin flexible blades, a grinding wheel having a peripheral abrading surface, means for rotating the wheel, a movable table in proximity to the wheel, a plurality of blade carrying fixtures mounted on the table for movement therewith, each fixture including a member for holding a blade during the grinding thereof, and means for moving the table to bring the several fixtures successively to a grinding station adjacent the abrading surface of the wheel, said moving means including means for reciprocating each blade holding member to repeatedly draw the blade held thereby across the abrading surface of the wheel while such member is at the grinding station at a speed less than that of the table during the movement of the latter bringing a succeeding fixture to the grinding station.

4. In a machine for grinding serrations in the cutting edge of an elongated thin flexible blade, an abrader, means for actuating the abrader, and a mechanism for holding a blade and presenting successive portions thereof to the abrader comprising a member having an abutment for the support of a blade in arcuate position, a ratchet member connected to the blade supporting member, a pawl engageable with the ratchet member to advance the latter and thereby shift the blade supporting member to present a succeeding portion of a blade supported thereby to the abrader, means for actuating the pawl, and means for preventing advancement of the ratchet by the pawl after a predetermined number of shifting movements of the blade supporting member.

5. In a machine for grinding serrations in the cutting edge of an elongated thin flexible blade, an abrader, means for actuating the abrader, and a mechanism for holding a blade and presenting successive portions thereof to the abrader comprising a member having an abutment for the support of a blade in arcuate position, a ratchet member connected to the blade supporting member, a pawl engageable with the ratchet member to advance the latter and thereby shift the blade supporting member to present a succeeding portion of a blade supported thereby to the abrader, means for actuating the pawl, a locking element arranged to engage the ratchet during each presentment of a blade portion to the abrader to prevent shifting of the blade supporting member during such presentment, and means for preventing advancement of the ratchet by the pawl after a predetermined number of shifting movements of the blade supporting member.

6. In a machine for grinding serrations in the cutting edge of an elongated thin flexible blade, an abrader, means for actuating the abrader, and a mechanism for holding a blade and presenting successive portions thereof to the abrader comprising a member having an abutment for the support of a blade in arcuate position, a ratchet member connected to the blade supporting member, a pawl engageable with the ratchet member to advance the latter and thereby shift the blade supporting member to present a succeeding portion of a blade supported thereby to the abrader, means for actuating the pawl, a locking element arranged to engage the ratchet during each presentment of a blade portion to the abrader to prevent shifting of the blade supporting member during such presentment, means for withdrawing the element from locking engagement with the ratchet after the grinding of each serration to permit advancement of the ratchet by the pawl, and means for preventing advancement of the ratchet by the pawl after a predetermined number of shifting movements of the blade supporting member.

7. In a machine for grinding serrations in the cutting edge of an elongated thin flexible blade, an abrader, means for actuating the abrader, and a mechanism for holding a blade and presenting successive portions thereof to the abrader comprising a member having an abutment for the support of a blade in arcuate position, a ratchet member connected to the blade supporting member, a pawl engageable with the ratchet member to advance the latter and thereby shift the blade supporting member to present a succeeding portion of a blade supported thereby to the abrader, means for actuating the pawl, a locking element arranged to engage the ratchet during each presentment of a blade portion to the abrader to prevent shifting of the blade supporting member during such presentment, and means for withdrawing the element from locking engagement with the ratchet after the grinding of each serration to permit advancement of the ratchet by the pawl.

8. In a blade grinding machine, an abrader, a mechanism for carrying a blade during the grinding thereof comprising a support, a member having an arcuate abutment to engage a bent blade, spindle means mounting the member on the support for rotatable movement with respect thereto, means supplying a grinding liquid to the abrader and a blade carried by the member, and a trough carried by the support to receive and divert grinding liquid flowing over the member, said trough having interfitting relation with the member about the spindle to prevent the flow of grinding liquid to the spindle.

9. In a machine for grinding serrations in the cutting edge of an elongated thin flexible blade, a blade supporting member having an abutment engageable with the blade adjacent the edge thereof opposite and paralleling the cutting edge and a blade backing element engageable with one side of the blade adjacent the cutting edge, said abutment and element having contact with only a minor portion of one side of the blade and being arranged so that the major portion of the side of the blade engaged by the backing element is exposed for contact with cooling liquid.

10. In a machine for grinding serrations in the cutting edges of elongated thin flexible blades, a grinding wheel having a peripheral abrading surface, means for rotating the wheel, a plurality of blade carrying fixtures mounted for successive movement to a grinding station in proximity to the wheel, means for reciprocating one of the fixtures while at the grinding station to draw the blade carried thereby across a first portion only of the abrading surface, and means for reciprocating another of the fixtures while at the grinding station to draw the blade carried thereby across a second portion of the abrading surface.

11. In a machine for grinding serrations in the cutting edges of elongated thin flexible blades, a grinding wheel having a peripheral abrading surface, means for rotating the wheel, a movable table in proximity to the wheel, a plurality of blade carrying fixtures mounted on the table for movement therewith, each fixture including a member for holding a blade during the grinding thereof, means for moving the table to bring the several fixtures successively to a grinding station adjacent the abrading surface of the wheel, said moving means including means for reciprocating each blade holding member at reduced speed across the abrading surface of the wheel while such member is at the grinding station, and means for intermittently moving said member in synchronization with the reciprocation thereof to successively present different portions of the blade held thereby to the abrading surface.

12. In a machine for grinding serrations in the cutting edges of blades, an abrader and actuating means therefore, a holder to receive a blade and support the same during grinding, a ratchet member connected to the holder, a pawl engageable with the member to intermittently advance the latter and thereby shift the holder to present different portions of a supported blade to the abrader, means for actuating the pawl, and means interposed between the ratchet and pawl after a predetermined number of shifting movements of the holder to prevent further advancement of the ratchet member.

13. A grinder comprising a supporting structure, an abrasive wheel and means for rotating the same, a movable carriage, a holder on the carriage for supporting the work to be ground, means for moving the carriage to move the holder between a loading station removed from the wheel and a grinding station adjacent the wheel and for reciprocating the holder at the grinding station, a ratchet member connected to the holder, a pawl engageable with the ratchet to advance the latter and thereby shift the holder to present different portions of supported work to the wheel, an abutment on the supporting structure, and mechanism for actuating the pawl in timed relation to the reciprocation of the holder, including a member engageable with the abutment during said reciprocation at the grinding station, said mechanism also including a lost motion connection to permit the last named member to ride over the abutment as the holder moves to the grinding station.

14. A grinder comprising an abrasive wheel, a reciprocable carriage and actuating means therefor, a pair of spaced work holders mounted on the carriage for rotative movement about axes normal to the direction of carriage reciprocation and successively movable with the carriage to a grinding station adjacent the wheel, means responsive to the carriage movement for controlling the actuating means to drive the carriage and reciprocate each holder back and forth over a relatively short path adjacent the wheel while the holder is at the grinding station, and means associated with each holder and responsive to the reciprocation thereof adjacent the wheel to rotate the holder.

15. A grinder comprising a supporting structure, an abrasive wheel, a reciprocable carriage and actuating means therefor, a pair of spaced work holders mounted on the carriage for independent rotative movement about axes normal to the direction of carriage movement and successively movable with the carriage to a grinding station adjacent the wheel, means responsive to the carriage movement for controlling the actuating means to drive the carriage and reciprocate each holder back and forth over a relatively short path at the grinding station, an abutment on the supporting structure, and separate means associated with each holder and including a member engageable with said abutment to rotate the holders in response to the carriage movement while each holder is adjacent the wheel.

16. In a machine for grinding serrations in the cutting edge of an elongated thin flexible blade, an abrader, a blade holder movably mounted adjacent the abrader, said holder including a member for receiving a blade to support the same during the grinding thereof, means for moving the holder toward and away from the abrader to intermittently present a supported blade to the abrader, means responsive to said movement of the holder for shifting the member after each presentment to advance the blade and present a different portion thereof to the abrader during the next movement of the holder toward the abrader, and an element movable after each shifting of the member to lock the same in shifted position during the abrading of the blade.

17. In a machine for grinding serrations in the cutting edge of an elongated thin flexible blade, a blade supporting member having an abutment engageable with the blade along the non-cutting edge thereof and a backing element spaced from the abutment and engageable with the blade adjacent the cutting edge, and apertures through the backing element to admit liquid coolant to the space between the abutment and the backing element during grinding.

18. In a machine for grinding serrations in the cutting edge of an elongated thin flexible blade, a blade supporting member having a pair of spaced, substantially parallel narrow and substantially continuous abutments for engaging one side of a blade to support the same during grinding, said abutments having contact with only a minor portion of one side of the blade and being arranged so that the major portion of the side of the blade engaged thereby is exposed for contact with liquid coolant, and means for admitting liquid coolant to the space between the abutments to contact the portions of the blade exposed therebetween.

19. In a machine for grinding serrations in the cutting edge of an elongated thin flexible blade, a member having spaced abutments to support a blade in an upright position, said abutments contacting spaced portions of one side of a supported blade to permit cooling liquid to contact portions of said side of the blade disposed between the abutments, and the space between abutments being less than the width of the blade.

20. In a machine for grinding serrations in the cutting edge of an elongated thin flexible blade, a member having spaced abutments to support a blade in an upright position, said abutments contacting spaced portions of one side of a supported blade to permit cooling liquid to contact portions of said side of the blade disposed between the abutments, the space between abutments being less than the width of the blade and the top surface of the member adjacent the upper edge of the blade being generally below the level of said edge, and said member having a portion extending upwardly above said level, said upwardly extending portion approximately paralleling a supported blade to direct liquid coolant against said side of the blade between the abutments.

21. In a machine for grinding blades, an abrader and actuating means therefor, a fixture mounted for relative reciprocating movement toward and away from the abrader and having a drum for receiving a blade and holding the same in bent position for presentment to the abrader, means for reciprocating the fixture, means operative in response to the movement of the fixture for turning the drum to successively present different portions of a blade to the abrader, means having connection with the drum to lock the same against rotation, and means operative in response to the movement of the fixture for releasing the locking means for rotation of the drum by the turning means.

22. In a machine for grinding blades, a wheel having a peripheral abrading surface, a fixture and means mounting the same for reciprocating movement toward and away from the wheel along a path paralleling the rotational axis of the wheel, a holder on the fixture for supporting a blade to be carried thereby on a work stroke from one edge of the wheel surface to the center thereof and on a return stroke from the center past the wheel edge, and means operative in response to the movement of the fixture for shifting the holder thereon to present different portions of a blade to said abrading surface on succeeding work strokes, said shifting means being arranged to commence the shifting of the holder on each return stroke prior to movement beyond the wheel edge of the blade portion ground on the preceding work stroke.

23. In a blade grinding machine, a wheel having a peripheral abrading surface and actuating means therefor, a plurality of blade carrying fixtures mounted for successive movement to a grinding station in proximity to the wheel, means for reciprocating one of the fixtures while at said station to draw the blade carried thereby across a first fractional portion of the abrading surface, and means for reciprocating another of the fixtures while at the grinding station to draw the blade carried thereby across a second fractional portion of the abrading surface which includes part of said first fractional portion.

24. A grinder comprising a supporting structure, an abrasive wheel and means for rotating the same, a movable carriage, a holder on the carriage for supporting the work to be ground, means for moving the carriage to move the holder between a loading station removed from the wheel and a grinding station adjacent the wheel and for reciprocating the holder at the grinding station, a ratchet member connected to the holder, a pawl engageable with the ratchet to advance the latter and thereby shift the holder to present different portions of supported work to the wheel, an abutment on the supporting structure, and mechanism for actuating the pawl in timed relation to the reciprocation of the holder, including a member engageable with the abutment during said reciprocation at the grinding station.

25. A blade grinding machine comprising a supporting structure, an abrasive wheel and actuating means therefor, a reciprocable carriage on the structure, a pair of spaced blade holders on the carriage, means for actuating the carriage to move the same and successively bring the holders to a grinding station in proximity to the wheel and to reciprocate the carriage back and forth over a relatively short path while each holder is at said station, an abutment on the structure, and mechanism associated with each holder to shift the same and present different portions of a blade carried by the holder to the wheel, each mechanism including a member engageable with the abutment while the associated holder is at the station to shift the holder in timed relation to the movement of the carriage.

26. A blade grinding machine comprising a supporting structure, an abrasive wheel and actuating means therefor, a reciprocable carriage on the structure, a pair of spaced blade holders on the carriage, means for actuating the carriage at one rate of speed to successively bring the holders to a grinding station in proximity to the wheel and to automatically reciprocate the carriage at a different rate of speed back and forth over a relatively short path while each holder is at said station, and mechanism associated with each holder to automatically shift the same on each reciprocation thereof at the station to successively present different portions of a blade supported thereby to the wheel.

27. A grinder for sharpening thin blades comprising a grinding wheel having a peripheral abrading surface, means for rotating the wheel, a first holder and a second holder for supporting blades to be sharpened, and means for alternately moving the holders to draw blades supported thereby across different portions of the abrading surface.

28. In a blade grinder, an abrader, a carrier comprising a support, an upright spindle journaled in the support, a holder mounted on the spindle for rotation therewith and having an arcuate abutment to engage a blade bent therearound, indexing mechanism below the support including a member secured to the spindle to rotate the same, means for supplying a grinding liquid to the abrader and a blade on the holder, and a trough carried by the support to receive and divert grinding liquid flowing from the holder, said trough having interfitting relation with the holder about the spindle to prevent the flow of grinding liquid to the spindle.

29. In a blade grinding machine, an abrader, a mechanism for carrying a blade during the grinding thereof comprising a support, a member having an arcuate abutment to engage a bent blade, spindle means mounting the member on the support for rotatable movement with respect thereto, means supplying a grinding liquid to the abrader and a blade carried by the member, and a trough to receive and divert grinding liquid flowing over the member, said trough having a bottom portion secured to the support and interfitted with the member about the spindle to prevent the flow of grinding liquid to the spindle, and said bottom portion being sloped downwardly and away from the blade engaging member to carry liquid away from the latter.

30. In a grinder, a fixture for mounting blades comprising a body, a spindle journaled in the body, a holder on the spindle having means for supporting a blade in curved position, a toothed wheel on the spindle, a pawl movable into engagement with the wheel teeth to hold the spindle against rotation, a ring member mounted for rotative movement about the rotational axis of the spindle, and means on said member having connection with the pawl to withdraw the latter from the toothed wheel upon rotative movement of the ring member.

31. In a grinder, a fixture for mounting blades comprising a body, a spindle journaled in the body, a holder on the spindle having means for supporting a blade in curved position, a toothed wheel on the spindle, a ring member mounted for rotative movement about the rotational axis of the spindle, a ratcheting pawl on the ring member and engageable with the toothed wheel to rotate the latter upon rotative movement of the ring member, and means for imparting rotative movement to the ring member.

32. In a grinder, a fixture for mounting blades comprising a body, a spindle journaled in the body, a holder on the spindle having means for supporting a blade in curved position, a toothed wheel on the spindle, a ring member mounted for rotative movement about the rotational axis of the spindle, a ratcheting pawl on the ring member and engageable with the toothed wheel to rotate the latter upon rotative movement of the ring member, an indexing pawl movable into engagement with the wheel teeth to hold the spindle against rotation, and means on the ring member having connection with the indexing pawl to withdraw the latter from the toothed wheel upon rotative movement of the ring member.

33. In a grinder, a fixture for mounting blades comprising a body, a spindle journaled in the body, a holder on the spindle having means for supporting a blade in curved position, a toothed wheel on the spindle, a pawl slidable on the body and movable into engagement with the wheel teeth to hold the spindle against rotation, a ring member mounted on the body for rotative movement about the rotational axis of the spindle, and a cam on the ring member engageable with the pawl to withdraw the latter from the toothed wheel upon rotative movement of the ring member.

34. In a grinder, a fixture for mounting blades comprising a body, a spindle journaled in the body, a holder on the spindle having means for supporting a blade in curved position, a toothed wheel on the spindle, an indexing pawl and a ratcheting pawl engageable with the wheel, a member operatively connected to the pawls to withdraw the indexing pawl from the wheel and to move the ratcheting pawl to rotate the wheel, and means for actuating said member.

35. In a grinder, a fixture for mounting blades comprising a body, a spindle journaled in the body, a holder on the spindle having means for supporting a blade in curved position, a toothed wheel on the spindle, a pawl and means for actuating the same to engage the wheel teeth and rotate the wheel, a member on the spindle adjacent the wheel and rotatable therewith, and an element on the member and overlying a portion of the wheel periphery to engage the pawl and prevent the latter engaging said portion of the wheel periphery.

36. In a grinder, a fixture for mounting blades comprising a body, a spindle journaled in the body, a holder on the spindle having means for supporting a blade in curved position, a toothed wheel on the spindle, a pawl and means for actuating the same to engage the wheel teeth and rotate the wheel, a disc rotatably adjustable on the spindle adjacent the wheel, means for locking the disc in adjusted position on the spindle, and an element on the disc and disposed to overlie a portion of the wheel periphery to mask the same and prevent engagement of said periphery portion by the pawl.

37. A grinder for sharpening thin blades comprising a grinding wheel having a peripheral abrading surface, means for rotating the wheel, a first holder and a second holder for supporting blades to be sharpened, and means operative to move the first holder to draw a blade supported thereby across a fractional part of the abrading surface and to then move the second holder to draw another blade supported thereby across a different fractional part of the abrading surface

GORDON J. CALAME.